US006666763B2

(12) United States Patent
Kawamura et al.

(10) Patent No.: US 6,666,763 B2
(45) Date of Patent: Dec. 23, 2003

(54) PREDICTION METHOD AND STORAGE MEDIUM

(75) Inventors: Yuya Kawamura, Nagoya (JP); Akio Sogabe, Nagoya (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/798,909

(22) Filed: Mar. 6, 2001

(65) Prior Publication Data

US 2002/0037760 A1 Mar. 28, 2002

(30) Foreign Application Priority Data

Sep. 25, 2000 (JP) ....................................... 2000-290658

(51) Int. Cl.[7] ................................................ G06F 17/18
(52) U.S. Cl. ............................................... 463/6; 700/93
(58) Field of Search .......................... 463/6, 42; 700/93

(56) References Cited

U.S. PATENT DOCUMENTS 4,031,376 A * 6/1977 Corkin, Jr. ................... 700/93
4,382,280 A * 5/1983 Mandel et al. ................ 700/93
6,325,721 B1 * 12/2001 Miyamoto et al. ............ 700/93

FOREIGN PATENT DOCUMENTS

| | | | |
|---|---|---|---|
| GB | 2 093 237 | * 8/1982 | ........... G06F/15/00 |
| JP | 6-176048 | * 6/1994 | ........... G06F/15/28 |
| JP | A-10-216355 | 8/1998 | |
| JP | A-11-290553 | 10/1999 | |
| JP | A-11-290554 | 10/1999 | |

* cited by examiner

*Primary Examiner*—Andrew M. Dolinar
(74) *Attorney, Agent, or Firm*—Staas & Halsey LLP.

(57) ABSTRACT

A race condition extraction unit extracts the past race results, which are the object of statistics, based on the race conditions of a target race. A factor extraction unit extracts effective factors, which are factors related to arrival order by sorting the extracted race results in arrival order. A factor conformation judgment unit judges whether each competitor participating in the target race conforms to each extracted effective factor and attaches a score to each competitor based on the judgment result. A race prediction unit predicts the race result of the target race based on both an analysis result obtained by the conventional method and the score attached by the factor conformation judgment unit. In this way, the statistics of past race results can be used in race prediction.

10 Claims, 20 Drawing Sheets

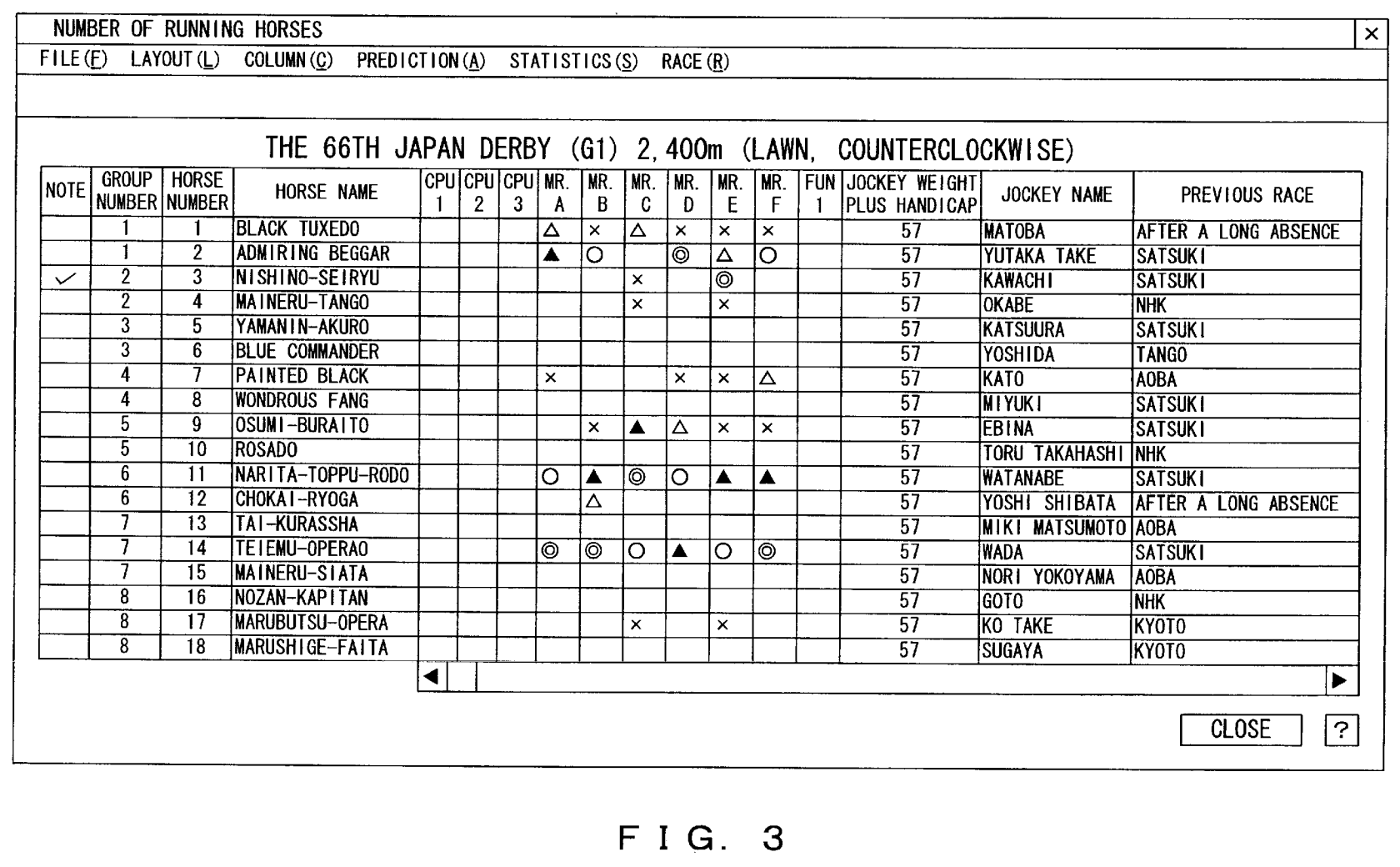

NUMBER OF RUNNING HORSES ×

FILE(F) LAYOUT(L) COLUMN(C) PREDICTION(A) STATISTICS(S) RACE(R)

THE 66TH JAPAN DERBY (G1) 2,400m (LAWN, COUNTERCLOCKWISE)

| NOTE | GROUP NUMBER | HORSE NUMBER | HORSE NAME | CPU 1 | CPU 2 | CPU 3 | MR. A | MR. B | MR. C | MR. D | MR. E | MR. F | FUN 1 | JOCKEY WEIGHT PLUS HANDICAP | JOCKEY NAME | PREVIOUS RACE |
|---|---|---|---|---|---|---|---|---|---|---|---|---|---|---|---|---|
| | 1 | 1 | BLACK TUXEDO | | | | △ | × | △ | × | × | × | | 57 | MATOBA | AFTER A LONG ABSENCE |
| | 1 | 2 | ADMIRING BEGGAR | | | | ▲ | ○ | | ◎ | △ | ○ | | 57 | YUTAKA TAKE | SATSUKI |
| ✓ | 2 | 3 | NISHINO-SEIRYU | | | | | | × | | ◎ | | | 57 | KAWACHI | SATSUKI |
| | 2 | 4 | MAINERU-TANGO | | | | | | × | | × | | | 57 | OKABE | NHK |
| | 3 | 5 | YAMANIN-AKURO | | | | | | | | | | | 57 | KATSUURA | SATSUKI |
| | 3 | 6 | BLUE COMMANDER | | | | | | | | | | | 57 | YOSHIDA | TANGO |
| | 4 | 7 | PAINTED BLACK | | | | × | | | × | × | △ | | 57 | KATO | AOBA |
| | 4 | 8 | WONDROUS FANG | | | | | | | | | | | 57 | MIYUKI | SATSUKI |
| | 5 | 9 | OSUMI-BURAITO | | | | | × | ▲ | △ | × | × | | 57 | EBINA | SATSUKI |
| | 5 | 10 | ROSADO | | | | | | | | | | | 57 | TORU TAKAHASHI | NHK |
| | 6 | 11 | NARITA-TOPPU-RODO | | | | ○ | ▲ | ◎ | ○ | ▲ | ▲ | | 57 | WATANABE | SATSUKI |
| | 6 | 12 | CHOKAI-RYOGA | | | | | △ | | | | | | 57 | YOSHI SHIBATA | AFTER A LONG ABSENCE |
| | 7 | 13 | TAI-KURASSHA | | | | | | | | | | | 57 | MIKI MATSUMOTO | AOBA |
| | 7 | 14 | TEIEMU-OPERAO | | | | ◎ | ◎ | ○ | ▲ | ○ | ◎ | | 57 | WADA | SATSUKI |
| | 7 | 15 | MAINERU-SIATA | | | | | | | | | | | 57 | NORI YOKOYAMA | AOBA |
| | 8 | 16 | NOZAN-KAPITAN | | | | | | | | | | | 57 | GOTO | NHK |
| | 8 | 17 | MARUBUTSU-OPERA | | | | | | × | | × | | | 57 | KO TAKE | KYOTO |
| | 8 | 18 | MARUSHIGE-FAITA | | | | | | | | | | | 57 | SUGAYA | KYOTO |

CLOSE ?

F I G. 3

RACE CONDITION-RELATED FACTOR DB 18

| RACE NAME | PLACE (SEASON) | CATEGORY | DISTANCE (COURSE) | RESTRICTION |
|---|---|---|---|---|
| NAKAYAMA GOLD CUP | (A) | (L) | (C) | (B) |
| ... | ... | ... | ... | ... |
| OKASHO TRIAL | (M) | (G) | (B) | (A) |
| ... | ... | ... | ... | ... |

F I G. 6

1) SELECTION BY PLACE (SEASON)

| SYMBOL | DESCRIPTION | REMARKS |
| --- | --- | --- |
| (A) | NAKAYAMA (WINTER) | 1ST NAKAYAMA, 5TH NAKAYAMA |
| (B) | TOKYO (WINTER) | 1ST TOKYO |
| (C) | NAKAYAMA (SPRING) | 2ND NAKAYAMA, 3RD NAKAYAMA |
| (D) | TOKYO (SPRING) | 2ND TOKYO, 3RD TOKYO |
| (E) | NIIGATA (SPRING) | 1ST NIIGATA |
| (F) | FUKUSHIMA (SUMMER) | 1ST FUKUSHIMA |
| (G) | NIIGATA (SUMMER) | 2ND NIIGATA, 3RD NIIGATA |
| (H) | NAKAYAMA (FALL) | 4TH NAKAYAMA |
| (I) | TOKYO (FALL) | 4TH TOKYO, 5TH TOKYO |
| (J) | FUKUSHIMA (FALL) | 2ND FUKUSHIMA, 3RD FUKUSHIMA |
| (K) | KYOTO (WINTER) | 1ST KYOTO, 2ND KYOTO |
| (L) | KOKURA (WINTER) | 1ST KOKURA |
| (M) | HANSHIN (SPRING) | 1ST HANSHIN, 2ND HANSHIN |
| (N) | CHUKYO (SPRING) | 1ST CHUKYO |
| (O) | KYOTO (SPRING) | 3RD KYOTO |
| (P) | CHUKYO (SUMMER) | 2ND CHUKYO |
| (Q) | HANSIN (SUMMER) | 3RD HANSHIN |
| (R) | CHUKYO (SPRING)) | 2ND KOKURA, 3RD KOKURA |
| (S) | HANSHIN (FALL) | 4TH HANSHIN |
| (T) | KYOTO (FALL) | 4TH KYOTO, 5TH KYOTO |
| (U) | CHUKYO (WINTER) | 3RD CHUKYO |
| (V) | HANSIN (WINTER) | 5TH HANSHIN |
| (W) | HAKODATE (SUMMER) | 1ST HAKODATE, 2ND HAKODATE |
| (X) | SAPPORO (SUMMER) | 1ST SAPPORO, 2ND SAPPORO |

* THE EXAMPLES DESCRIBED ABOVE ARE FOR A NORMAL YEAR.
TO CORRESPOND TO A SPECIAL RACE FOR 2000, SUCH A TABLE IS PROVIDED FOR EACH YEAR.

EX.) 4TH TOKYO IN 2000 → TOKYO (SPRING)

FIG. 7

2) SELECTION BY CATEGORY

| SYMBOL | DESCRIPTION | REMARKS |
|---|---|---|
| (A) | 3 YEARS-OLD | 3 YEARS-OLD NEW |
| (B) | 3 YEARS-OLD NON-VICTORY | 3 YEARS-OLD NON-VICTORY |
| (C) | 3 YEARS-OLD OPEN | 3 YEARS-OLD 5,000,000m OR LESS, 3 YEARS-OLD OPEN |
| (D) | 4 YEARS-OLD NEW | 4 YEARS-OLD NEW, 4-YEARS NON-RUNNING |
| (E) | 4 YEARS-OLD NON-VICTORY | 4 YEARS-OLD NON-VICTORY |
| (F) | 4 YEARS-OLD 5,000,000m OR LESS | 4 YEARS-OLD 5,000,000m OR LESS |
| (G) | 4 YEARS-OLD OPEN | 4 YEARS-OLD 9,000,000m OR LESS, 4 YEARS-OLD OPEN |
| (H) | OLD 5,000,000m OR LESS | 4 (5) YEARS-OLD OR MORE 5,000,000m OR LESS |
| (I) | OLD 9,000,000m OR LESS (AGE SEPARATELY DESIGNATED) | 4 (5) YEARS-OLD OR MORE 9,000,000m OR LESS (AGE SEPARATELY DESIGNATED) |
| (J) | OLD 9,000,000m OR LESS (HANDICAPPED) | 4 (5) YEARS-OLD OR MORE 9,000,000m OR LESS (HANDICAPPED) |
| (K) | OLD HORSE OPEN (AGE SEPARATELY DESIGNATED) | 4 (5) YEARS-OLD OR MORE 16,000,000m OR LESS OPEN (AGE SEPARATELY DESIGNATED) |
| (L) | OLD HORSE OPEN (HANDICAPPED) | 4 (5) YEARS-OLD OR MORE 16,000,000m OR LESS (HANDICAPPED) |
| (M) | OBSTACLE NON-VICTORY | OBSTACLE NON-VICTORY |
| (N) | OBSTACLE OPEN | OBSTACLE OPEN |

3) SELECTION BY DISTANCE (COURSE)

| SYMBOL | DESCRIPTION | REMARKS |
|---|---|---|
| (A) | SHORT (LAWN) | LAWN 1,000-1,200 |
| (B) | MILE (LAWN) | LAWN 1,400-1,700 |
| (C) | MIDDLE (LAWN) | LAWN 1,800-2,000 |
| (D) | CLASSIC (LAWN) | LAWN 2,100-2,500 |
| (E) | LONG (LAWN) | LAWN 2,600- |
| (F) | SHORT (DIRT) | DIRT 1,000-1,200 |
| (G) | MILE (DIRT) | DIRT 1,400-1,700 |
| (H) | LONG (DIRT) | DIRT 1,800- |
| (I) | OBSTACLE | OBSTACLE |

4) SELECTION BY RESTRICTION

| SYMBOL | DESCRIPTION | REMARKS |
|---|---|---|
| (A) | LIMITED TO MARE | LIMITED RACE FOR MARE |
| (B) | EXCEPT MARE | EXCEPT LIMITED RACE FOR MARE |

FIG. 8

| NO | CATEGORY | CONDITION | ITEM | ○ | × |
|---|---|---|---|---|---|
| 1 | JOCKEY WEIGHT PLUS HANDICAP (WEIGHT) | | JOCKEY WEIGHT PLUS HANDICAP INCREASES/DECREASES COMPARED WITH PREVIOUS RUNNING. | NO INCREASE | INCREASES |
| 2 | | | JOCKEY WEIGHT PLUS HANDICAP INCREASES/DECREASES BY 2 KILOMETERS OR MORE COMPARED WITH PREVIOUS RUNNING | NO INCREASE | INCREASES |
| 3 | | | JOCKEY WEIGHT PLUS HANDICAP INCREASES/DECREASES BY 3 KILOMETERS OR MORE COMPARED WITH PREVIOUS RUNNING | NO INCREASE | INCREASES |
| 4 | | | JOCKEY WEIGHT PLUS HANDICAP INCREASES/DECREASES COMPARED WITH PREVIOUS RUNNING. | DECREASES | NO DECREASE |
| 5 | | | JOCKEY WEIGHT PLUS HANDICAP INCREASES/DECREASES BY 2 KILOMETERS OR MORE COMPARED WITH PREVIOUS RUNNING | DECREASES | NO DECREASE |
| 6 | | | JOCKEY WEIGHT PLUS HANDICAP INCREASES/DECREASES BY 3 KILOMETERS OR MORE COMPARED WITH PREVIOUS RUNNING | DECREASES | NO DECREASE |
| 7 | ARRIVAL ORDER | PREVIOUS RUNNING | FIRST | YES | NO |
| 8 | | | FIRST OR SECOND | YES | NO |
| 9 | | | FIRST, SECOND OR THIRD | YES | NO |
| 10 | | | OTHERS THAN FIRST, SECOND, THIRD, FOURTH AND FIFTH | NO | YES |
| 11 | | SECOND-PREVIOUS RUNNING +PREVIOUS RUNNING | FIRST IN BOTH RACES | YES | NO |
| 12 | | | FIRST OR SECOND IN BOTH RACES | YES | NO |
| 13 | | | FIRST, SECOND OR THIRD IN BOTH RACES | YES | NO |
| 14 | | | OTHER THAN FIRST, SECOND, THIRD, FOURTH AND FIFTH IN BOTH RACES | NO | YES |
| 15 | | | FIRST IN EITHER OF THE RACES | YES | NO |
| 16 | | | FIRST OR SECOND IN EITHER OF THE RACES | YES | NO |
| 17 | | | FIRST, SECOND OR THIRD IN EITHER OF THE RACES | YES | NO |
| 18 | | | OTHER THAN FIRST, SECOND, THIRD, FOURTH AND FIFTH IN EITHER OF THE RACES | NO | YES |
| 19 | | THIRD-PREVIOUS RUNNING +SECOND-PREVIOUS RUNNING +PREVIOUS RUNNING | FIRST IN ALL RACES | YES | NO |
| 20 | | | FIRST OR SECOND IN ALL RACES | YES | NO |
| 21 | | | FIRST, SECOND OR THIRD IN ALL RACES | YES | NO |
| 22 | | | OTHER THAN FIRST, SECOND, THIRD, FOURTH AND FIFTH IN ALL RACES | NO | YES |
| 23 | | | FIRST IN ONE OF THE RACES | YES | NO |
| 24 | | | FIRST OR SECOND IN ONE OF THE RACES | YES | NO |
| 25 | | | FIRST, SECOND OR THIRD IN ONE OF THE RACES | YES | NO |
| 26 | | | OTHER THAN FIRST, SECOND, THIRD, FOURTH AND FIFTH IN ONE OF THE RACES | NO | YES |
| 27 | POPULARITY | PREVIOUS RUNNING | MOST POPULAR | YES | NO |
| 28 | | | MOST OR SECOND-MOST POPULAR | YES | NO |
| 29 | | | MOST, SECOND-MOST OR THIRD-MOST POPULAR | YES | NO |
| 30 | | | FOURTH-MOST POPULAR OR LESS | NO | YES |
| 31 | | SECOND-PREVIOUS RUNNING +PREVIOUS RUNNING | MOST POPULAR IN BOTH RACES | YES | NO |
| 32 | | | MOST OR SECOND-MOST POPULAR IN BOTH RACES | YES | NO |
| 33 | | | MOST, SECOND-MOST OR THIRD-MOST POPULAR IN BOTH RACES | YES | NO |
| 34 | | | FOURTH-MOST POPULAR OR LESS | NO | YES |
| 35 | | | MOST POPULAR IN EITHER OF THE RACES | YES | NO |
| 36 | | | MOST POPULAR OR SECOND-MOST POPULAR IN EITHER OF THE RACES | YES | NO |
| 37 | | | MOST POPULAR, SECOND-MOST POPULAR OR THIRD-MOST POPULAR IN EITHER OF THE RACES | YES | NO |
| 38 | | | OTHER THAN MOST POPULAR, SECOND-MOST POPULAR AND THIRD-MOST POPULAR IN EITHER OF THE RACES | NO | YES |
| 39 | | THIRD-PREVIOUS RUNNING +SECOND-PREVIOUS RUNNING +PREVIOUS RUNNING | MOST POPULAR IN ALL THE RACES | YES | NO |
| 40 | | | MOST POPULAR OR SECOND-MOST POPULAR IN ALL THE RACES | YES | NO |
| 41 | | | MOST POPULAR, SECOND-MOST POPULAR OR THIRD-MOST POPULAR IN ALL THE RACES | YES | NO |
| 42 | | | OTHER THAN MOST POPULAR, SECOND-MOST POPULAR AND THIRD-MOST POPULAR IN ALL THE RACES | NO | YES |
| 43 | | | MOST POPULAR IN ONE OF THE RACES | YES | NO |
| 44 | | | MOST POPULAR OR SECOND-MOST POPULAR IN ONE OF THE RACES | YES | NO |
| 45 | | | MOST POPULAR, SECOND-MOST POPULAR OR THIRD-MOST POPULAR IN ONE OF THE RACES | YES | NO |
| 46 | | | OTHER THAN MOST POPULAR, SECOND-MOST POPULAR AND THIRD-MOST POPULAR IN ONE OF THE RACES | NO | YES |
| 47 | FIRST OR SECOND VICTORY RATIO | ALL RACES | FIRST OR SECOND VICTORY RATIO 100% | OR MORE | LESS THAN |
| 48 | | | FIRST OR SECOND VICTORY RATIO 70% OR MORE | OR MORE | LESS THAN |
| 49 | | | FIRST OR SECOND VICTORY RATIO 50% OR MORE | OR MORE | LESS THAN |
| 51 | | | FIRST OR SECOND VICTORY RATIO 30% OR LESS | OR MORE | LESS THAN |
| 52 | | | FIRST OR SECOND VICTORY RATIO 20% OR LESS | OR MORE | LESS THAN |
| 53 | | RELEVANT RACE | FIRST OR SECOND VICTORY RATIO 100% | OR MORE | LESS THAN |
| 54 | | | FIRST OR SECOND VICTORY RATIO 70% OR MORE | OR MORE | LESS THAN |
| 55 | | | FIRST OR SECOND VICTORY RATIO 50% OR MORE | OR MORE | LESS THAN |
| 57 | | | FIRST OR SECOND VICTORY RATIO 30% OR LESS | OR MORE | LESS THAN |
| 58 | | | FIRST OR SECOND VICTORY RATIO 20% OR LESS | OR MORE | LESS THAN |
| 59 | HORSE WEIGHT | SECOND-PREVIOUS RUNNING +PREVIOUS RUNNING | WEIGHT MINUS | | |
| 60 | | | -10 KILOGRAMS OR MORE | | |
| 61 | | | -8 TO +8 KILOGRAMS | | |
| 62 | | | WEIGHT PLUS | | |
| 63 | | | +10 KILOGRAMS OR MORE | | |
| 64 | | THIRD-PREVIOUS RUNNING +SECOND-PREVIOUS RUNNING +PREVIOUS RUNNING | KEEPS DECREASING | | |
| 65 | | | KEEPS INCREASING | | |
| 66 | ARRIVAL DIFFERENCE | | ONE-HORSE LENGTH IN A PREVIOUS RACE | WITHIN | OR MORE |
| 67 | | | TWO-HORSES LENGTH IN A PREVIOUS RACE | WITHIN | OR MORE |
| 68 | | | THREE-HORSES LENGTH IN A PREVIOUS RACE | WITHIN | OR MORE |

FIG. 9

| | | | | | |
|---|---|---|---|---|---|
| 69 | | | FOUR-HORSES LENGTH IN A PREVIOUS RACE | WITHIN | OR MORE |
| 70 | DIFFERENCE IN SECOND | | 0.2 SECONDS IN A PREVIOUS RACE | WITHIN | OR MORE |
| 71 | | | 0.5 SECONDS IN A PREVIOUS RACE | WITHIN | OR MORE |
| 72 | | | 1 SECOND IN A PREVIOUS RACE | WITHIN | OR MORE |
| 74 | PREVIOUS RUNNING | PREVIOUS RUNNING | CONSECUTIVELY RUN | NO | YES |
| 75 | | | AFTER REST | NO | YES |
| 76 | | | MOST POPULAR | YES | NO |
| 77 | | | DELAY IN START | NO | YES |
| 78 | HEAVY GROUND | | WON ONCE IN A HEAVY GROUND | OR MORE | LESS THAN |
| 79 | | | WON TWICE IN A HEAVY GROUND | OR MORE | LESS THAN |
| 80 | | | WON THREE TIMES IN A HEAVY GROUND | OR MORE | LESS THAN |
| 81 | | | WON FOUR TIMES IN A HEAVY GROUND | OR MORE | LESS THAN |
| 82 | | | WON FIVE TIMES IN A HEAVY GROUND | OR MORE | LESS THAN |
| 84 | | | FIRST OR SECOND VICTORY RATIO 100% IN A HEAVY GROUND | OR MORE | LESS THAN |
| 85 | | | FIRST OR SECOND VICTORY RATIO 50% IN A HEAVY GROUND | OR MORE | LESS THAN |
| 87 | | | FIRST OR SECOND VICTORY RATIO 0% IN A HEAVY GROUND | OR MORE | LESS THAN |
| 88 | DISTANCE | | EXPERIENCED 1,000-1,200m | YES | NO |
| 89 | | | EXPERIENCED 1,200-1,400m | YES | NO |
| 90 | | | EXPERIENCED 1,400-1,600m | YES | NO |
| 91 | | | EXPERIENCED 1,600-1,800m | YES | NO |
| 92 | | | EXPERIENCED 1,800-2,000m | YES | NO |
| 93 | | | EXPERIENCED 2,000-2,200m | YES | NO |
| 94 | | | EXPERIENCED 2,200-2,400m | YES | NO |
| 95 | | | EXPERIENCED 2,400-3,000m | YES | NO |
| 96 | | | EXPERIENCED 3,000-3,600m | YES | NO |
| 97 | | | WON ONCE | YES | NO |
| 108 | | RELEVANT DISTANCE | WON TWICE | OR MORE | LESS THAN |
| 109 | | | WON THREE TIMES | OR MORE | LESS THAN |
| 110 | | | WON FOUR TIMES | OR MORE | LESS THAN |
| 111 | | | | OR MORE | LESS THAN |
| 114 | CLOCKWISE/COUNTERCLOCKWISE | RELEVANT COURSE | WON ONCE | OR MORE | LESS THAN |
| 115 | | | WON TWICE | OR MORE | LESS THAN |
| 116 | | | WON THREE TIMES | OR MORE | LESS THAN |
| 117 | | | WON FOUR TIMES | OR MORE | LESS THAN |
| 120 | LAWN/DIRT | RELEVANT COURSE | WON ONCE | OR MORE | LESS THAN |
| 121 | | | WON TWICE | OR MORE | LESS THAN |
| 122 | | | WON THREE TIMES | OR MORE | LESS THAN |
| 123 | | | WON FOUR TIMES | OR MORE | LESS THAN |
| 126 | INTERVAL/REST | | CONSECUTIVELY RUN | | |
| 127 | | | ONE-WEEK INTERVAL | | |
| 128 | | | TWO-WEEKS INTERVAL | | |
| 129 | | | THREE-WEEKS INTERVAL | | |
| 130 | | | FOUR-WEEKS INTERVAL | | |
| 131 | | | FIVE-WEEKS INTERVAL | | |
| 132 | | | SIX-WEEKS INTERVAL | | |
| 133 | | | TWO MONTHS | | |
| 134 | | | THREE MONTHS | | |
| 135 | | | FOUR MONTHS | | |
| 136 | | | FIVE MONTHS | | |
| 137 | | | SIX MONTHS OR MORE | | |
| 138 | JOCKEY | | CHANGED | NO | YES |
| 139 | | | JOCKEY WITH REDUCED WEIGHT | NO | YES |
| 140 | GROUP NO. | | GROUP NO. 1 | | |
| 141 | | | GROUP NO. 2 | | |
| 142 | | | GROUP NO. 3 | | |
| 143 | | | GROUP NO. 4 | | |
| 144 | | | GROUP NO. 5 | | |
| 145 | | | GROUP NO. 6 | | |
| 146 | | | GROUP NO. 7 | | |
| 147 | | | GROUP NO. 8 | | |
| 148 | SEASON | | SPRING | | |
| 149 | | | SUMMER | | |
| 150 | | | FALL | | |
| 151 | | | WINTER | | |
| 152 | RUNNING ABILITY | | QUICK FLIGHT | | |
| 153 | | | FLIGHT | | |
| 154 | | | PRECEDING | | |
| 155 | | | OUTRUNNING | | |

FIG. 10

| | | | | | |
|---|---|---|---|---|---|
| 156 | | | CHASING | | |
| 157 | POPULARITY | | MOST POPULAR | YES | NO |
| 158 | | | SECOND-MOST POPULAR | YES | NO |
| 159 | | | THIRD-MOST POPULAR | YES | NO |
| 160 | | | FOURTH-MOST POPULAR OR LESS | YES | NO |
| 161 | SEX | WITHOUT RESTRICTION FOR STALLION | STALLION | | |
| 162 | | WITHOUT RESTRICTION FOR MARE | MARE | | |
| 163 | | WITHOUT RESTRICTION FOR NON-EXPERIENCED GELDING | GELDING | | |
| 164 | AGE | EXCLUDING THREE YEARS-OLD RACE | FOUR YEARS-OLD | | |
| 165 | | | FIVE YEARS-OLD | | |
| 166 | | | SIX YEARS-OLD | | |
| 167 | | | SEVEN YEARS-OLD | | |
| 168 | | | EIGHT YEARS-OLD OR MORE | | |
| 169 | FALL FROM A HORSE | OBSTACLE RACE | EXPERIENCED FALL | NON-EXISTENCE | EXISTENCE |
| 171 | TIME-OVER | | EXPERIENCED | NON-EXISTENCE | EXISTENCE |
| 173 | JOCKEY | EXCLUDING LOCAL RACE | WON ONCE | OR MORE | LESS THAN |
| 174 | | | WON TWICE | OR MORE | LESS THAN |
| 175 | | | WON THREE TIMES | OR MORE | LESS THAN |
| 176 | | | WON FOUR TIMES | OR MORE | LESS THAN |
| 177 | | | WON FIVE TIMES | OR MORE | LESS THAN |
| 179 | SLOPE | | WON ONCE | OR MORE | LESS THAN |
| 180 | | | WON TWICE | OR MORE | LESS THAN |
| 181 | | | WON THREE TIMES | OR MORE | LESS THAN |
| 182 | | | WON FOUR TIMES | OR MORE | LESS THAN |
| 185 | FIRST COURSE | RELEVANT RACE | FIRST COURSE | YES | NO |

FIG. 11

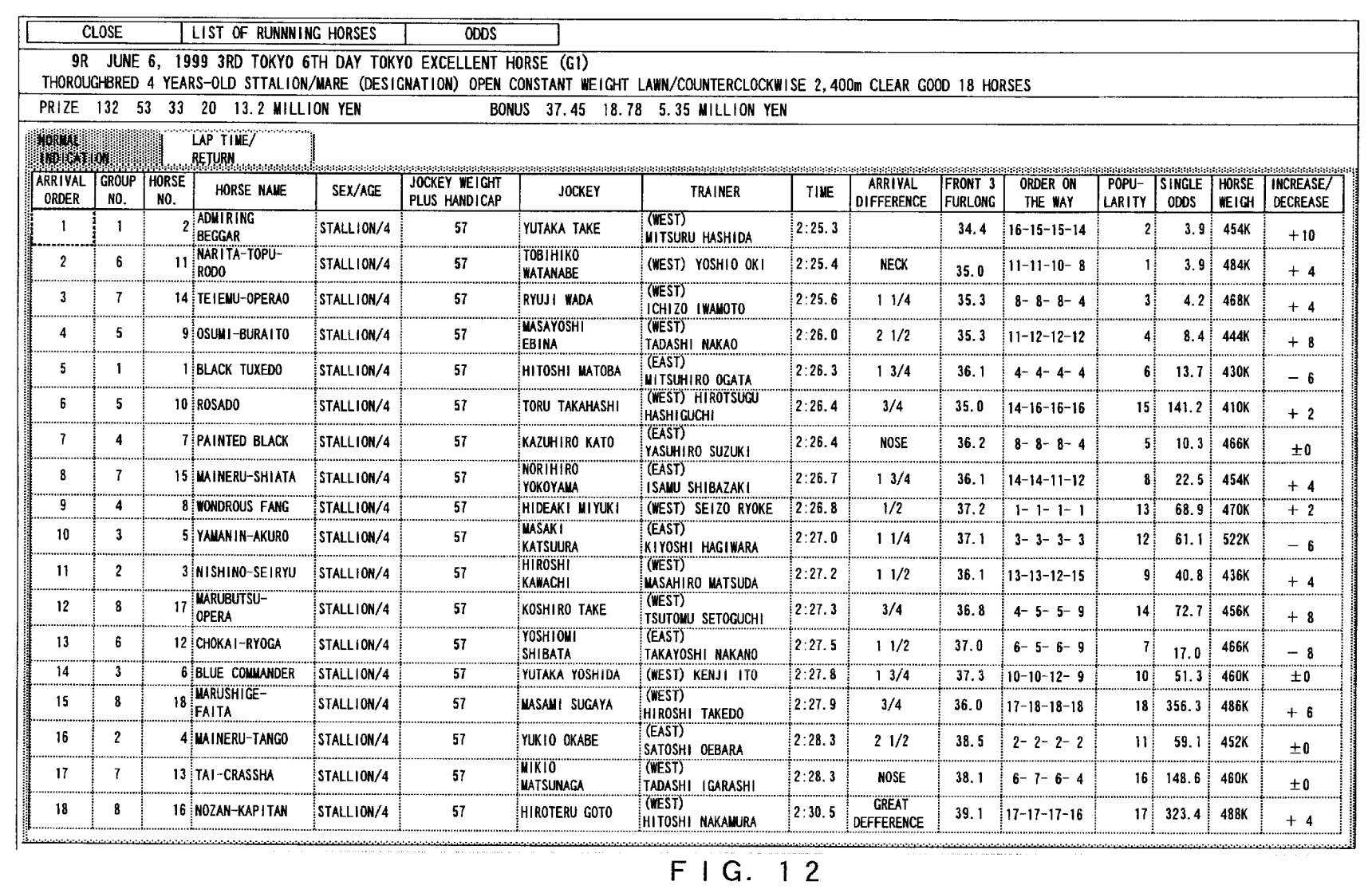

CLOSE | LIST OF RUNNNING HORSES | ODDS

9R JUNE 6, 1999 3RD TOKYO 6TH DAY TOKYO EXCELLENT HORSE (G1)
THOROUGHBRED 4 YEARS-OLD STTALION/MARE (DESIGNATION) OPEN CONSTANT WEIGHT LAWN/COUNTERCLOCKWISE 2,400m CLEAR GOOD 18 HORSES

PRIZE 132 53 33 20 13.2 MILLION YEN BONUS 37.45 18.78 5.35 MILLION YEN

NORMAL INDICATION | LAP TIME/ RETURN

| ARRIVAL ORDER | GROUP NO. | HORSE NO. | HORSE NAME | SEX/AGE | JOCKEY WEIGHT PLUS HANDICAP | JOCKEY | TRAINER | TIME | ARRIVAL DIFFERENCE | FRONT 3 FURLONG | ORDER ON THE WAY | POPU-LARITY | SINGLE ODDS | HORSE WEIGH | INCREASE/ DECREASE |
|---|---|---|---|---|---|---|---|---|---|---|---|---|---|---|---|
| 1 | 1 | 2 | ADMIRING BEGGAR | STALLION/4 | 57 | YUTAKA TAKE | (WEST) MITSURU HASHIDA | 2:25.3 | | 34.4 | 16-15-15-14 | 2 | 3.9 | 454K | +10 |
| 2 | 6 | 11 | NARITA-TOPU-RODO | STALLION/4 | 57 | TOBIHIKO WATANABE | (WEST) YOSHIO OKI | 2:25.4 | NECK | 35.0 | 11-11-10- 8 | 1 | 3.9 | 484K | + 4 |
| 3 | 7 | 14 | TEIEMU-OPERAO | STALLION/4 | 57 | RYUJI WADA | (WEST) ICHIZO IWAMOTO | 2:25.6 | 1 1/4 | 35.3 | 8- 8- 8- 4 | 3 | 4.2 | 468K | + 4 |
| 4 | 5 | 9 | OSUMI-BURAITO | STALLION/4 | 57 | MASAYOSHI EBINA | (WEST) TADASHI NAKAO | 2:26.0 | 2 1/2 | 35.3 | 11-12-12-12 | 4 | 8.4 | 444K | + 8 |
| 5 | 1 | 1 | BLACK TUXEDO | STALLION/4 | 57 | HITOSHI MATOBA | (EAST) MITSUHIRO OGATA | 2:26.3 | 1 3/4 | 36.1 | 4- 4- 4- 4 | 6 | 13.7 | 430K | − 6 |
| 6 | 5 | 10 | ROSADO | STALLION/4 | 57 | TORU TAKAHASHI | (WEST) HIROTSUGU HASHIGUCHI | 2:26.4 | 3/4 | 35.0 | 14-16-16-16 | 15 | 141.2 | 410K | + 2 |
| 7 | 4 | 7 | PAINTED BLACK | STALLION/4 | 57 | KAZUHIRO KATO | (EAST) YASUHIRO SUZUKI | 2:26.4 | NOSE | 36.2 | 8- 8- 8- 4 | 5 | 10.3 | 466K | ±0 |
| 8 | 7 | 15 | MAINERU-SHIATA | STALLION/4 | 57 | NORIHIRO YOKOYAMA | (EAST) ISAMU SHIBAZAKI | 2:26.7 | 1 3/4 | 36.1 | 14-14-11-12 | 8 | 22.5 | 454K | + 4 |
| 9 | 4 | 8 | WONDROUS FANG | STALLION/4 | 57 | HIDEAKI MIYUKI | (WEST) SEIZO RYOKE | 2:26.8 | 1/2 | 37.2 | 1- 1- 1- 1 | 13 | 68.9 | 470K | + 2 |
| 10 | 3 | 5 | YAMANIN-AKURO | STALLION/4 | 57 | MASAKI KATSUURA | (EAST) KIYOSHI HAGIWARA | 2:27.0 | 1 1/4 | 37.1 | 3- 3- 3- 3 | 12 | 61.1 | 522K | − 6 |
| 11 | 2 | 3 | NISHINO-SEIRYU | STALLION/4 | 57 | HIROSHI KAWACHI | (WEST) MASAHIRO MATSUDA | 2:27.2 | 1 1/2 | 36.1 | 13-13-12-15 | 9 | 40.8 | 436K | + 4 |
| 12 | 8 | 17 | MARUBUTSU-OPERA | STALLION/4 | 57 | KOSHIRO TAKE | (WEST) TSUTOMU SETOGUCHI | 2:27.3 | 3/4 | 36.8 | 4- 5- 5- 9 | 14 | 72.7 | 456K | + 8 |
| 13 | 6 | 12 | CHOKAI-RYOGA | STALLION/4 | 57 | YOSHIOMI SHIBATA | (EAST) TAKAYOSHI NAKANO | 2:27.5 | 1 1/2 | 37.0 | 6- 5- 6- 9 | 7 | 17.0 | 466K | − 8 |
| 14 | 3 | 6 | BLUE COMMANDER | STALLION/4 | 57 | YUTAKA YOSHIDA | (WEST) KENJI ITO | 2:27.8 | 1 3/4 | 37.3 | 10-10-12- 9 | 10 | 51.3 | 460K | ±0 |
| 15 | 8 | 18 | MARUSHIGE-FAITA | STALLION/4 | 57 | MASAMI SUGAYA | (WEST) HIROSHI TAKEDO | 2:27.9 | 3/4 | 36.0 | 17-18-18-18 | 18 | 356.3 | 486K | + 6 |
| 16 | 2 | 4 | MAINERU-TANGO | STALLION/4 | 57 | YUKIO OKABE | (EAST) SATOSHI OEBARA | 2:28.3 | 2 1/2 | 38.5 | 2- 2- 2- 2 | 11 | 59.1 | 452K | ±0 |
| 17 | 7 | 13 | TAI-CRASSHA | STALLION/4 | 57 | MIKIO MATSUNAGA | (WEST) TADASHI IGARASHI | 2:28.3 | NOSE | 38.1 | 6- 7- 6- 4 | 16 | 148.6 | 460K | ±0 |
| 18 | 8 | 16 | NOZAN-KAPITAN | STALLION/4 | 57 | HIROTERU GOTO | (WEST) HITOSHI NAKAMURA | 2:30.5 | GREAT DEFFERENCE | 39.1 | 17-17-17-16 | 17 | 323.4 | 488K | + 4 |

FIG. 12

SCORE IMPORTANCE DEGREE DB 21

| PREDICTION STYLE NAME | PEDIGREE | RUNNING ABILITY/ DEVELOPMENT | GROUP NO. | SEX/AGE | JOCKEY WEIGHT PLUS HANDICAP | POPULARITY | HORSE BODY | STATISTICAL DATA |
|---|---|---|---|---|---|---|---|---|
| stile.dat | 1. 0 | 1. 0 | 0. 2 | 0 | 0. 8 | 1. 0 | 1. 0 | 0. 4 |
| ... | ... | ... | ... | ... | ... | ... | ... | ... |
| | | | | | | | | |

F I G. 1 3

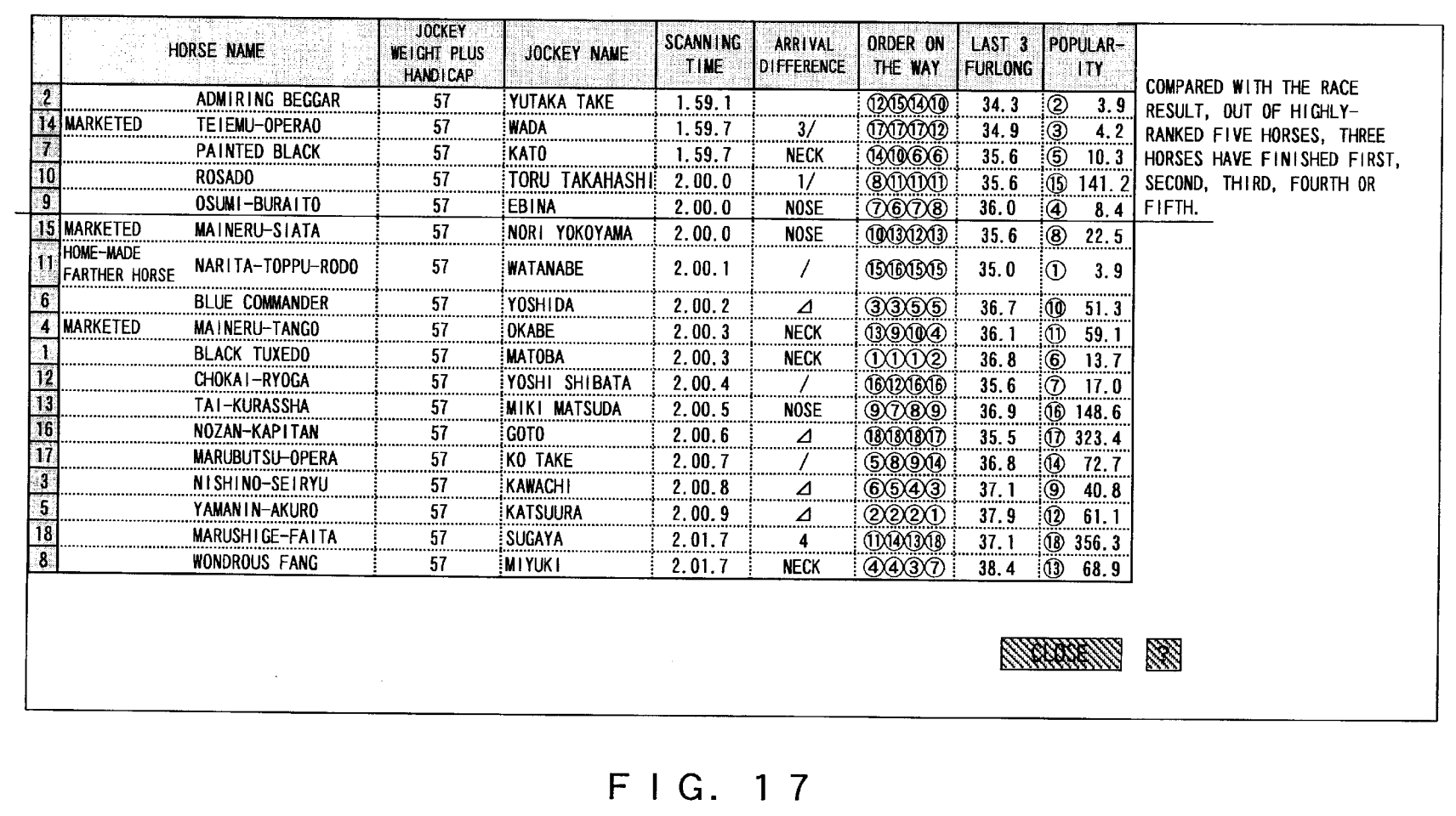

| | | HORSE NAME | JOCKEY WEIGHT PLUS HANDICAP | JOCKEY NAME | SCANNING TIME | ARRIVAL DIFFERENCE | ORDER ON THE WAY | LAST 3 FURLONG | POPULAR-ITY |
|---|---|---|---|---|---|---|---|---|---|
| 2 | | ADMIRING BEGGAR | 57 | YUTAKA TAKE | 1.59.1 | | ⑫⑮⑭⑩ | 34.3 | ② 3.9 |
| 14 | MARKETED | TEIEMU-OPERAO | 57 | WADA | 1.59.7 | 3/ | ⑰⑰⑰⑫ | 34.9 | ③ 4.2 |
| 7 | | PAINTED BLACK | 57 | KATO | 1.59.7 | NECK | ⑭⑩⑥⑥ | 35.6 | ⑤ 10.3 |
| 10 | | ROSADO | 57 | TORU TAKAHASHI | 2.00.0 | 1/ | ⑧⑪⑪⑪ | 35.6 | ⑮ 141.2 |
| 9 | | OSUMI-BURAITO | 57 | EBINA | 2.00.0 | NOSE | ⑦⑥⑦⑧ | 36.0 | ④ 8.4 |
| 15 | MARKETED | MAINERU-SIATA | 57 | NORI YOKOYAMA | 2.00.0 | NOSE | ⑩⑬⑫⑬ | 35.6 | ⑧ 22.5 |
| 11 | HOME-MADE FARTHER HORSE | NARITA-TOPPU-RODO | 57 | WATANABE | 2.00.1 | / | ⑮⑯⑮⑮ | 35.0 | ① 3.9 |
| 6 | | BLUE COMMANDER | 57 | YOSHIDA | 2.00.2 | ⊿ | ③③⑤⑤ | 36.7 | ⑩ 51.3 |
| 4 | MARKETED | MAINERU-TANGO | 57 | OKABE | 2.00.3 | NECK | ⑬⑨⑩④ | 36.1 | ⑪ 59.1 |
| 1 | | BLACK TUXEDO | 57 | MATOBA | 2.00.3 | NECK | ①①①② | 36.8 | ⑥ 13.7 |
| 12 | | CHOKAI-RYOGA | 57 | YOSHI SHIBATA | 2.00.4 | / | ⑯⑫⑯⑯ | 35.6 | ⑦ 17.0 |
| 13 | | TAI-KURASSHA | 57 | MIKI MATSUDA | 2.00.5 | NOSE | ⑨⑦⑧⑨ | 36.9 | ⑯ 148.6 |
| 16 | | NOZAN-KAPITAN | 57 | GOTO | 2.00.6 | ⊿ | ⑱⑱⑱⑰ | 35.5 | ⑰ 323.4 |
| 17 | | MARUBUTSU-OPERA | 57 | KO TAKE | 2.00.7 | / | ⑤⑧⑨⑭ | 36.8 | ⑭ 72.7 |
| 3 | | NISHINO-SEIRYU | 57 | KAWACHI | 2.00.8 | ⊿ | ⑥⑤④③ | 37.1 | ⑨ 40.8 |
| 5 | | YAMANIN-AKURO | 57 | KATSUURA | 2.00.9 | ⊿ | ②②②① | 37.9 | ⑫ 61.1 |
| 18 | | MARUSHIGE-FAITA | 57 | SUGAYA | 2.01.7 | 4 | ⑪⑭⑬⑱ | 37.1 | ⑱ 356.3 |
| 8 | | WONDROUS FANG | 57 | MIYUKI | 2.01.7 | NECK | ④④③⑦ | 38.4 | ⑬ 68.9 |

COMPARED WITH THE RACE RESULT, OUT OF HIGHLY-RANKED FIVE HORSES, THREE HORSES HAVE FINISHED FIRST, SECOND, THIRD, FOURTH OR FIFTH.

CLOSE ?

F I G. 17

| | HORSE NAME | | JOCKEY WEIGHT PLUS HANDICAP | JOCKEY NAME | SCANNING TIME | ARRIVAL DIFFERENCE | ORDER ON THE WAY | LAST 3 FURLONG | POPULAR-ITY | |
|---|---|---|---|---|---|---|---|---|---|---|
| 2 | | ADMIRING BEGGAR | 57 | YUTAKA TAKE | 1594 | | ⑯⑪⑰⑨ | 34.7 | ② 3.9 | |
| 14 | MARKETED | TEIEMU-OPERAO | 57 | WADA | 1594 | HEAD | ⑱⑱⑱⑮ | 34.5 | ③ 4.2 | |
| 9 | | OSUMI-BURAITO | 57 | EBINA | 1595 | / | ⑩⑦⑦⑤ | 35.7 | ④ 8.4 | |
| 11 | HOME-MADE FARTHER HORSE | NARITA-TOPPU-RODO | 57 | WATANABE | 2000 | 2/ | ⑰⑭⑬⑬ | 35.7 | ① 3.9 | |
| 12 | | CHOKAI-RYOGA | 57 | YOSHI SHIBATA | 2000 | NECK | ⑫⑮⑭⑭ | 35.6 | ⑦ 17.0 | |
| 16 | | NOZAN-KAPITAN | 57 | GOTO | 2003 | 1⊿ | ⑭⑰⑯⑰ | 35.7 | ⑰ 323 | |
| 10 | | ROSADO | 57 | TORU TAKAHASHI | 2003 | NECK | ⑪⑬⑫⑫ | 36.1 | ⑮ 141 | |
| 15 | MARKETED | MAINERU-SIATA | 57 | NORI YOKOYAMA | 2004 | NECK | ⑬⑯⑮⑯ | 35.9 | ⑧ 22.5 | |
| 4 | MARKETED | MAINERU-TANGO | 57 | OKABE | 2004 | HEAD | ⑦⑤⑤② | 36.7 | ⑪ 59.1 | |
| 3 | | NISHINO-SEIRYU | 57 | KAWACHI | 2004 | NOSE | ③④④① | 36.9 | ⑨ 40.8 | |
| 7 | | PAINTED BLACK | 57 | KATO | 2005 | NOSE | ⑨⑫⑪⑪ | 36.3 | ⑤ 10.3 | |
| 18 | | MARUSHIGE-FAITA | 57 | SUGAYA | 2005 | NECK | ⑥⑩⑩⑦ | 36.7 | ⑱ 356 | |
| 13 | | TAI-KURASSHA | 57 | MIKI MATSUDA | 2007 | 1⊿ | ⑤⑧⑧⑥ | 36.9 | ⑯ 148 | |
| 17 | | MARUBUTSU-OPERA | 57 | KO TAKE | 2009 | ⊿ | ⑮⑨⑨⑱ | 36.9 | ⑭ 72.7 | |
| 5 | HOME-MADE FARTHER HORSE | YAMANIN-AKURO | 57 | KATSUURA | 2011 | 1 | ①①②③ | 38.2 | ⑫ 61.1 | |
| 6 | | BLUE COMMANDER | 57 | YOSHIDA | 2012 | / | ⑧⑥⑥⑩ | 37.2 | ⑩ 51.3 | |
| 1 | | BLACK TUXEDO | 57 | MATOBA | 2012 | / | ②③①⑧ | 37.7 | ⑥ 13.7 | |
| 8 | | WONDROUS FANG | 57 | MIYUKI | 2016 | 1⊿ | ④②③④ | 38.3 | ⑬ 68.9 | |

COMPARED WITH THE RACE RESULT, OUT OF HIGHLY-RANKED FIVE HORSES, FOUR HORSES HAVE FINISHED FIRST, SECOND, THIRD, FOURTH OR FIFTH.

CLOSE ?

FIG. 18

PREDICTION METHOD AND STORAGE MEDIUM

BACKGROUND OF THE INVENTION

1. Field of the Invention

The present invention relates to a method for predicting the result of a race, in particular the arrival order of competitors participating in a race.

2. Description of the Related Art

Currently many races of human being and animals, such as a bicycle race, a boat race, a horse race, a dog race, etc., are held. Several prediction devices for predicting the results of these races are also provided. For the examples, there are prediction devices disclosed in Japanese Patent Laid-open Nos. 10-216355, 11-290553 and 11-290554. Patent Laid-open No. 10-216355 discloses predicting the arrival order of a race based on the capability value of racehorses. Both Patent Laid-open Nos. 11-290553 and 11-290554 disclose predicting the result of a horse race based on information about racehorses, such as a training result, running ability, pedigree, etc.

FIG. 1 shows the concept of the conventional prediction device. As shown in FIG. 1, the conventional prediction device predicts race results based on the characteristic peculiar to an individual racehorse (hereinafter called a "horse characteristic") led by the capability, pedigree, running ability of an individual racehorse. Since this concept in the case of a racehorse also applies to other races, a factor related to a competitor, such as a racehorse, that is, running human being, animal, vehicle, etc., is called a competitor-related factor.

FIG. 2 is a flowchart showing the process of the conventional prediction device. The process of the conventional prediction device is described with reference to FIG. 2. First, the prediction device receives the designation of a race the result of which a user wants to obtain (hereinafter called a "target race") from the user (step ST10). Then, the prediction device judges whether each competitor participating in a target race conforms to the competitor-related factor (step ST12). It is judged whether each racehorse is good at a target horse race ground, for example, good at a long lawn course or whether the father horse of each racehorse has won a major race. Information about the physical condition before a race of each racehorse is sometimes taken into consideration.

Based on the judgment result in step ST12, the prediction device attaches a score to each competitor (step ST14) and presents the result with a score to the user (step ST16). The user judges the arrival order of each competitor based on the result with a score. FIG. 3 shows an example of the conventional prediction result of a horse race. As shown in FIG. 3, a prediction result varies depending on a predictor. This is because a race result prediction is influenced by the predictor's handling of each factor constituting a competitor-related factor or the predictor's subjective importance degree of each factor.

As described above, the conventional prediction device has a problem that the prediction result of a race is influenced by a predictor's subjectivity, that is, the handling of each factor constituting this competitor-related factor of the manufacturer and user of a prediction device. For example, in the case of a horse race, although a horse characteristic is composed of pedigree, a training result (physical condition), etc., the handling of pedigree and a physical condition, the subjective importance degree of these factors vary depending on the subjectivity of the manufacturer and user of a prediction device. That is, the prediction result of a race varies depending on the subjectivity of the manufacturer and user of a prediction device, which is a problem. This leads to the dispersion of prediction reliability.

In the conventional prediction device uses a competitor-related factor, but does not use a factor that is found when past race results are statistically processed, etc., which is another problem.

SUMMARY OF THE INVENTION

It is an object of the present invention to enable the use of the statistical result of past race results, which are rather objective, in addition to the analysis result of a competitor-related factor, which is influenced by the subjectivity of the manufacturer and user of a prediction device in view of the problems described above and eventually to improve prediction reliability.

As described above, the present invention is useful for the result prediction of a race, in particular when the arrival order of competitors participating a race is predicted.

According to the first aspect, the prediction device for predicting a race result comprises a statistical unit for statistically processing past race results with a condition related to the race condition of a target race and a prediction unit for predicting the result of a target race based on both the analysis result that is based on the characteristic of each competitor participating in the target race and the statistical result obtained by the statistical unit.

In this way, a race result can be predicted using the statistical result of past races, which is rather objective, in addition to the analysis result based on a competitor-related factor being the individual characteristic of each competitor, which has a disadvantage of being influenced by the subjectivity of the manufacturer, etc., of a prediction device. Eventually, the dispersion ratio of prediction reliability can be reduced and prediction reliability can be improved.

In the configuration the statistical unit can also comprise a race condition extraction unit for extracting the past race results with the same race condition as that of the target race. In that case, by extracting a past race result with the same race condition as that of a target race and taking statistics of these extracted past race results, statistical data can be made appropriate and as a result, a more reliable statistical result can be obtained. In this case, for a race condition, information about the place, time and category of a race can also be used.

Also, in the configuration, the statistical unit can comprise a factor extraction unit for extracting an effective factor, which is related to arrival order, from past race results by sorting the past race results according to arrival order and a factor conformation judgment unit for judging whether each competitor participating in a target race conforms to the extracted effective factor and attaching information about the judgment result to each competitor.

By sorting past race results according to arrival order, an effective factor related to arrival order can be obtained. This effective factor can be expected to be useful for the prediction of arrival order. For example, in the case of a horse race it is assumed that most of the racehorses that have won in past horse races have a tendency to "lose three or more kilograms of weight before the race". Then, it can be expected that the "loss of three or more of weight" is an effective factor related to arrival order and can be useful for the prediction of arrival order. In this case, it is judged whether each racehorse participating in a target race conforms to the effective factor of "losing three or more kilograms in weight", and a score is attached to a satisfied competitor. In this way, a racehorse with the same tendency as that of a racehorse that has won in past horse races can be found out of racehorses participating in a target race. By repeating such judgment for several effective factors, a racehorse having the high possibility of wining the race can be statistically found.

An effective factor can be obtained by sorting the items of past race results stored in a competition tendency-related factor storage unit and extracting an item with a prescribed tendency which most of competitors that have obtained good results show. Such an effective factor can be used to find a competitor having a high possibility of obtaining a good result.

Conversely, by extracting an item with a prescribed tendency which most of competitors that have not obtained good results show, an effective factor can also be obtained. Such an effective factor can be used to find a competitor having a low possibility of obtaining a good result.

Further, in the configuration, the prediction unit can predict the result of a target race based on both the analysis result that is based on the characteristic of each competitor participating in the target race and the importance degree, which indicates the degree of importance (weight) of the statistical result of past race results. In this case, by setting the importance degree, a user can determine the importance degree of both the analysis result on each competitor and the statistical result of past race results.

In the configuration, a prediction device can also be a network terminal and can receive past race results to be used for statistics via a network.

Another aspect of the present invention is a prediction method for predicting a race result. In this case, past race results with a condition related to the race condition of a target race are statistically processed, and the result of the target race is predicted based on both the analysis result that is based on the characteristic of each competitor participating in the target race and the statistical result. In this way too, the problems described above can be solved.

The problems can also be solved by making a computer to read a program for enabling a computer to exercise the same control as the function performed by each configuration described above, from a computer-readable storage medium on which is recorded the program and to execute the program.

BRIEF DESCRIPTION OF THE DRAWINGS

The feature and advantages of the present invention will be more clearly appreciated from the following description taken in conjunction with the accompanying drawings in which the same elements are denoted by the same reference numbers and in which:

FIG. 3 shows an example of the result of the conventional race result prediction;

FIG. 6 shows an example of the data structure of a race condition-related factor database;

FIG. 7 shows an example of the item of a race condition-related factor (No. 1);

FIG. 8 shows an example of the item of a race condition-related factor (No. 2);

FIG. 9 shows an example of the data structure of a race tendency-related factor database (No. 1);

FIG. 10 shows an example of the data structure of a race tendency-related factor database (No. 2);

FIG. 11 shows an example of the data structure of a race tendency-related factor database (No. 3);

FIG. 12 shows an example of the past race result;

FIG. 13 shows an example of the data structure of a score importance degree database;

FIG. 17 shows the comparison of the conventional race result prediction result and that of the present invention (No. 1);

FIG. 18 shows the comparison of the conventional race result prediction result and that of the present invention (No. 2);

DESCRIPTIONS OF PREFERRED EMBODIMENTS

The preferred embodiments of the present invention are described below with reference to the drawings. The same units are denoted by the same reference numbers and the descriptions are omitted. Although as an example of a race, a horse race is used in the description, the present invention is not limited to a horse race.

Figure 1:
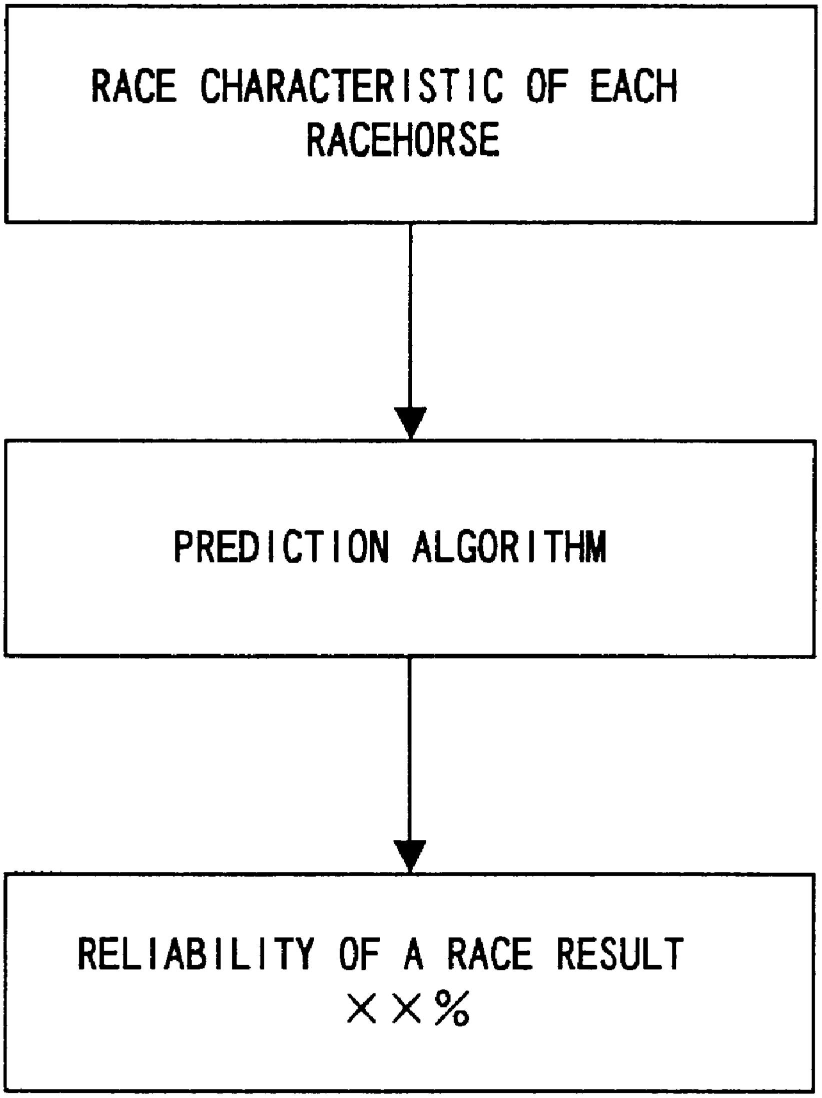
FIG. 1 shows the concept of the conventional prediction device.
Figure 2:
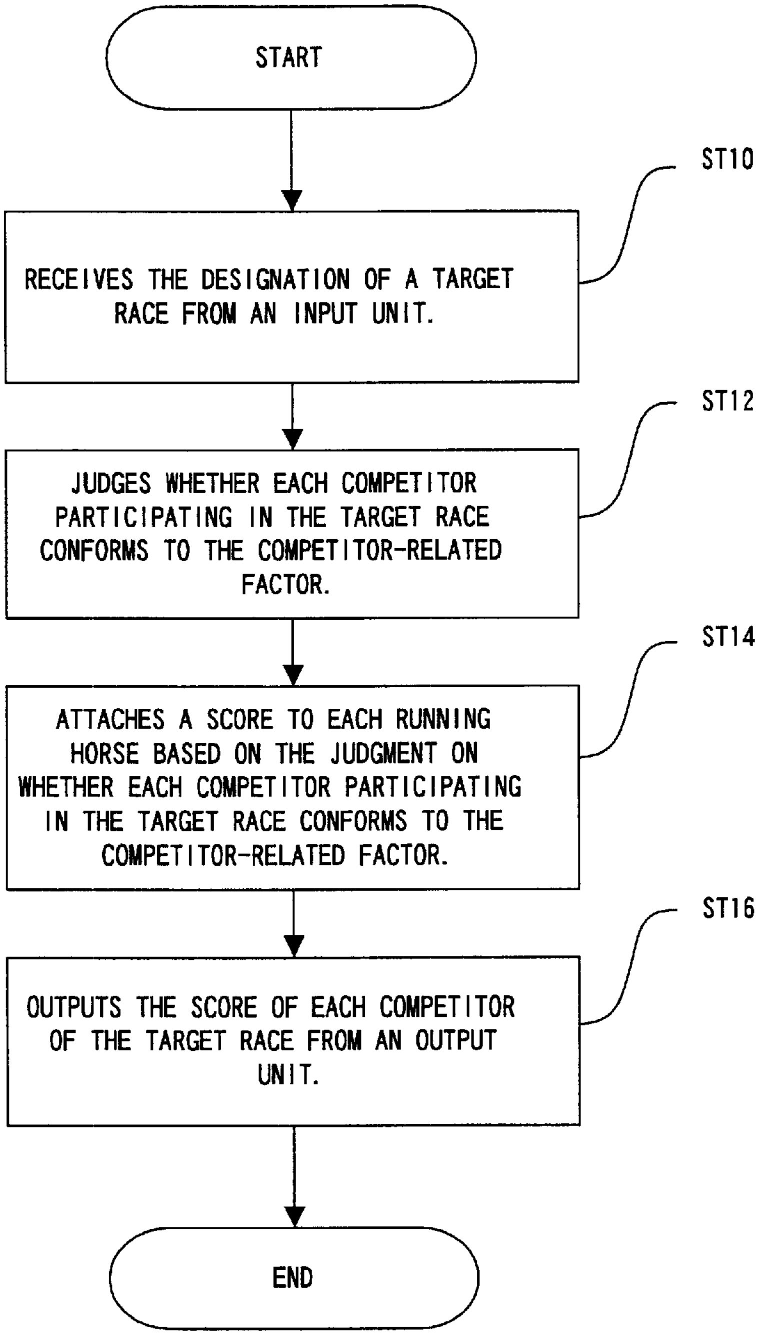
FIG. 2 is a flowchart showing the process of the conventional prediction device.
Figure 4:
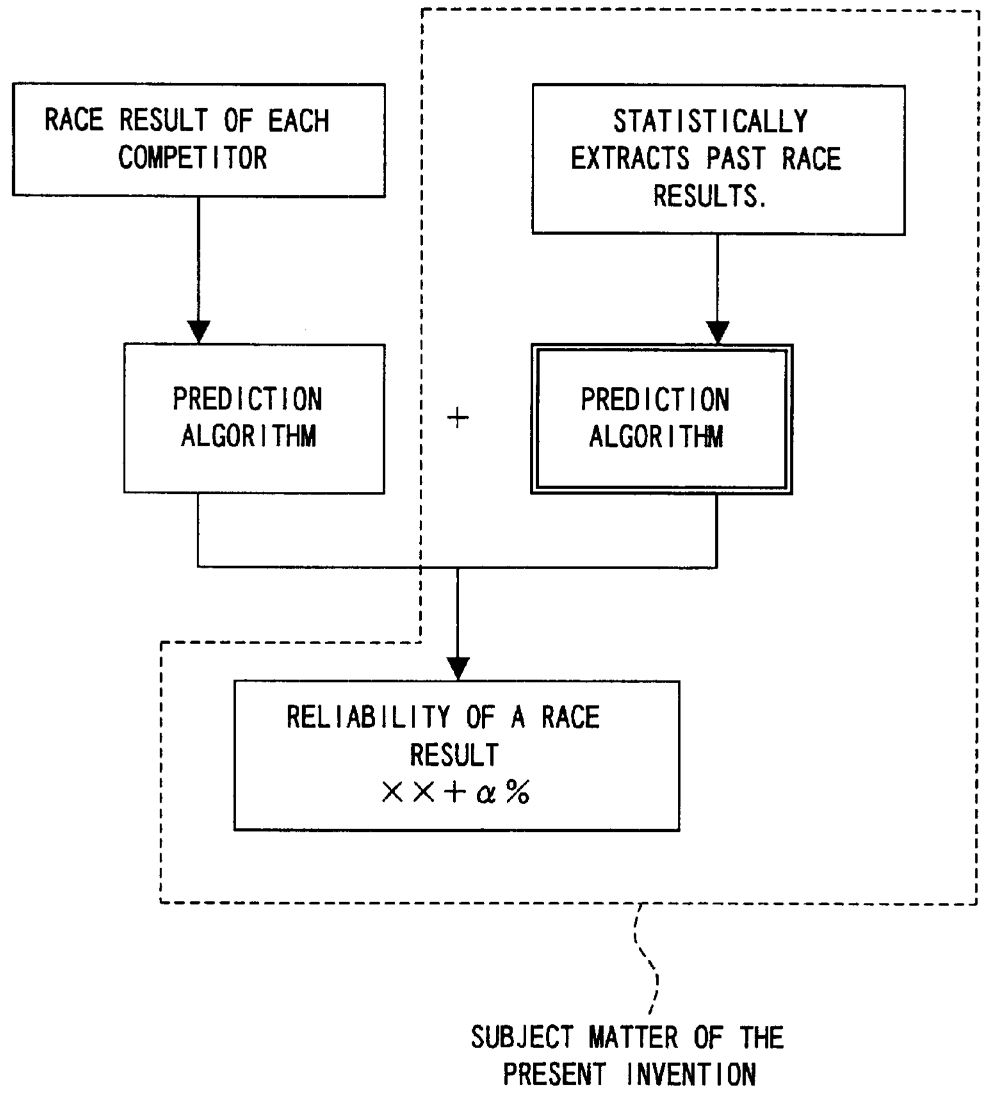
FIG. 4 shows the concept of the prediction device of the present invention.

FIG. 4 shows the concept of the present invention. As shown in FIG. 4, according to the present invention, the result of a target race is predicted by combining the analysis result based on a competitor-related factor, such as the past race result, pedigree, current physical condition, etc., of each competitor participating in a target race and a result obtained by statistically processing past race results with the same race condition as the race condition of the target race. In other words, the subject matter of the present invention is to conduct the simulation of a target race by uniting an analysis result based on a competitor-related factor and a result obtained by statistically processing past race results. A section representing this subject matter is enclosed with dotted lines in FIG. 4.

The race result prediction based on an analysis result that is based on a competitor-related factor is influenced by the handling of each factor constituting a competitor-related factor of the manufacturer and user of a prediction device and the subjective importance degree of the factor of the manufacturer and user of a prediction, that is, by the manufacturer's and user's subjectivity. However, according to the present invention, the result of a target race can be predicted based on a statistical result of past race results, which is rather objective, in addition to an analysis that is based on a competitor-related factor, which is rather subjective. Eventually, by using a statistical result, prediction reliability is prevented from scattering and as a result, prediction reliability can be improved.

Figure 5:
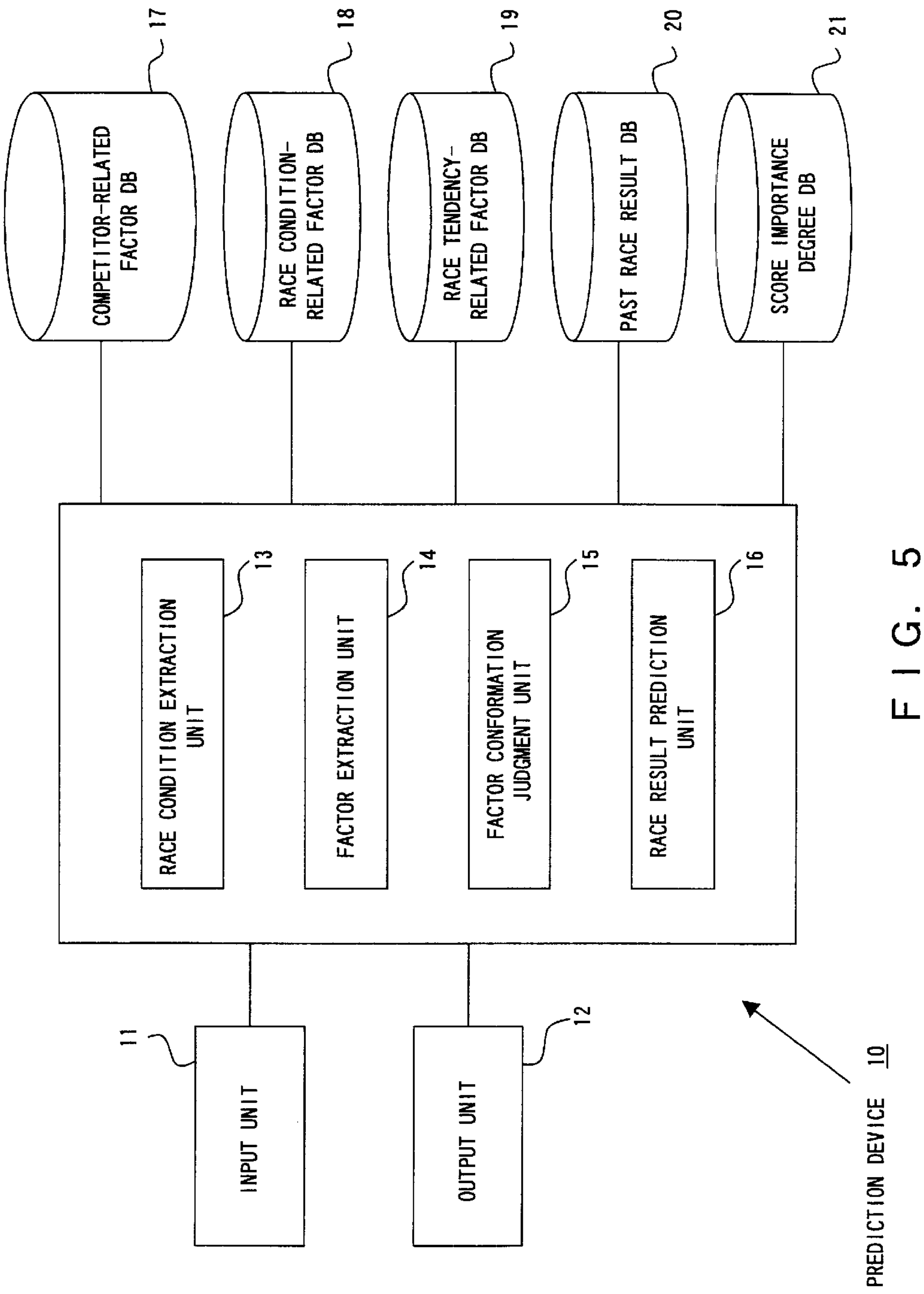
FIG. 5 shows the configuration of the preferred embodiment of the present invention.

FIG. 5 shows the configuration of the prediction device in the preferred embodiment of the present invention. The prediction device 10 in this preferred embodiment comprises an input unit 11, an output unit 12, a race condition extraction unit 13, a factor extraction unit 14, a factor conformation judgment unit 15, a race result prediction unit 16, a competitor-related factor database (hereinafter a database is abbreviated as a "DB") 17, a race condition-related factor DB 18, a race tendency-related factor DB 19 and a past race result DB 20 and a score importance degree DB 21.

The input unit 11 is used for a user to input data. The output unit 12 is used to output both necessary information and a calculation result to a user from the prediction device 10. The race condition extraction unit 13 selects the race condition of a target race from race condition-related factors stored in the race condition-related factor DB 18 and extracts past race results to be taken statistics of from the past race result DB 20 based on the selected race condition-related factor. More specifically, the race condition extraction unit 13 extracts a past race result with the same race condition-related item as the selected race condition-related factor. In this case, the past race result of each competitor participating in a target race is not extracted.

The factor extraction unit 14 extracts a race tendency-related factor, a first/first or first or second victory ratio of which is close to 100% or 0% as an effective factor with high correlation to arrival order by sorting past race results extracted by the race condition extraction unit 13 for each race tendency-related factor stored in the race tendency-related factor DB 19 in arrival order and calculating a first/first or first or second victory ratio of each race tendency-related factor based on the sorting result.

The factor conformation judgment unit 15 judges whether each competitor participating in a target race conforms to the extracted effective factor using information stored in the past race result DB 20, etc., and attaches a score to each competitor based on the judgment result.

The race result prediction unit 16 unites a score calculated based on a result obtained based on a competitor-related factor, such as the pedigree, Jockey weight plus handicap, etc., of each competitor and a score calculated by the factor conformation judgment unit 15 by statistically processing past race results, and calculates the final score of each competitor participating in a target race, based on each piece of score importance degree for indicating the importance degree of each score, stored in the score importance degree DB 21.

The competitor-related factor DB 17 stores both information about a competitor-related factor, such as the current physical condition, pedigree, etc., of each competitor participating in the target race and a result obtained by analyzing each competitor participating the target race using the information, like that of the conventional method.

The race condition-related factor DB 18 stores information obtained by sorting the race conditions of each race for each race condition-related factor. The information is stored in advance or inputted by a user, and is updated from time to time.

The race tendency-related factor DB 19 stores race tendency-related factors, which are items used when past race results are statistically processed. Past race results are sorted in arrival order for each race tendency-related factor. The past race result DB 20 stores the race condition, arrival order, race development, etc., of a past race result as well as information about popularity before race, etc. The information of both the race tendency-related factor DB 19 and past race result DB 20 are stored in advance and is updated from time to time, as required.

The score importance degree DB 21 stores the importance degree of both each result obtained by analyzing based on a competitor-related factor and each result obtained by statistically processing past race results, that is, score importance degree.

The data structure of each of the DBs 18 to 21 is described below. Since the competitor-related factor DB 17 is the same as that of the conventional technology, the description is omitted here. FIG. 6 shows an example of the data structure of the race condition-related factor DB 18. The race condition-related factor DB 18 stores both a race name and race condition-related factors for each target race. The race condition-related factor is obtained by sorting the race conditions of each race based on, for example, a place/season, category, course, etc. For example, the race condition of Nakayama Gold Cup is "Held at Nakayama in January, old horse and open (handicapped), lawn course 2,000 m long, mare/stallion mixed". Therefore, the selection by place (season), selection by category, selection by distance (course) and selection by restriction of the race condition-related factor of Nakayama Gold Cup are "Nakayama (winter)", "old horse (handicapped)", "middle distance (lawn)" and "except designated mare", respectively. For the meaning of each symbol shown in FIG. 6, see FIGS. 7 and 8. FIGS. 7 and 8 show an example of the items of a race condition-related factor. Race condition-related factors are sorted and provided with an identification symbol for each of a place/season, category and course, as shown in FIGS. 7 and 8. FIGS. 9, 10 and 11 show an example of the data structure of the race tendency-related factor DB 19. The race tendency-related factor DB 19 stores item identification numbers (item identification information), categories, conditions, items, conformation/non-conformation. Each item is a race tendency-related factor. A category indicates information about the subject of each race tendency-related factor, and a condition is obtained by further sorting the category. A category includes Jockey weight plus handicap, arrival order, popularity, etc. The past race result DB 20 stores information about the race result, popularity, etc., of a past race based on these categories. The number of similar statistic data can be reduced by sorting in this way.

The factor extraction unit 14 judges whether each competitor participating in the past races extracted by the race condition extraction unit 13, conforms to all race tendency-related factors stored in the race tendency-related factor DB 19 shown in FIGS. 9, 10 and 11, and sorts the judgment results in arrival order. Then, the unit 14 calculates a first/first or first or second victory ratio for each race tendency-related factor, based on the sorting result.

FIG. 12 shows an example of the past race result stored in the past race result DB 20. FIG. 12 shows the race result of the sixth day race in Tokyo of the Third Tokyo Excellent Horse Race held Jun. 6, 1999 as an example.

"Thoroughbred four years-old, mare/stallion, open (category), handicapped, lawn, counterclockwise 2,400 m" on the second line in FIG. 12 indicates a race condition. "Clear, good, 18 horses" on the second line indicates climate, the condition of a race ground and the number of participating horses, respectively. The third line indicates information about prize. The table shown in FIG. 12 indicates the arrival order, group number, horse number, horse name, sex, age, Jockey weight plus handicap, jockey, trainer, each piece of data for indicating a race result, increase/decrease in horse weight, etc., of each participating horse. The contents of the table are stored for each race tendency-related factor stored in the race tendency-related factor DB 19 in such a way that the race factor extraction unit 14 can judge whether each horse conforms to each race tendency-related factor. The content of the past race result DB 20 is stored in advance or is obtained from a server, which is not shown in FIG. 5, via a network, and is updated from time to time.

FIG. 13 shows an example of the data structure of the score importance degree DB 21. As shown in FIG. 13, the score importance degree DB 21 stores both information peculiar to each competitor, such as pedigree, running ability/development, horse group, sex, age, Jockey weight plus handicap, popularity, horse weight, etc., and importance degree for indicating the importance degree (weight) of each piece of information obtained by taking statistics of past race results. In this way, the importance degree indicates the weight of each item. Therefore, the larger a value is, the higher importance degree is. Importance degree stored in the score importance degree DB 21 is inputted by a user.

Figure 14:
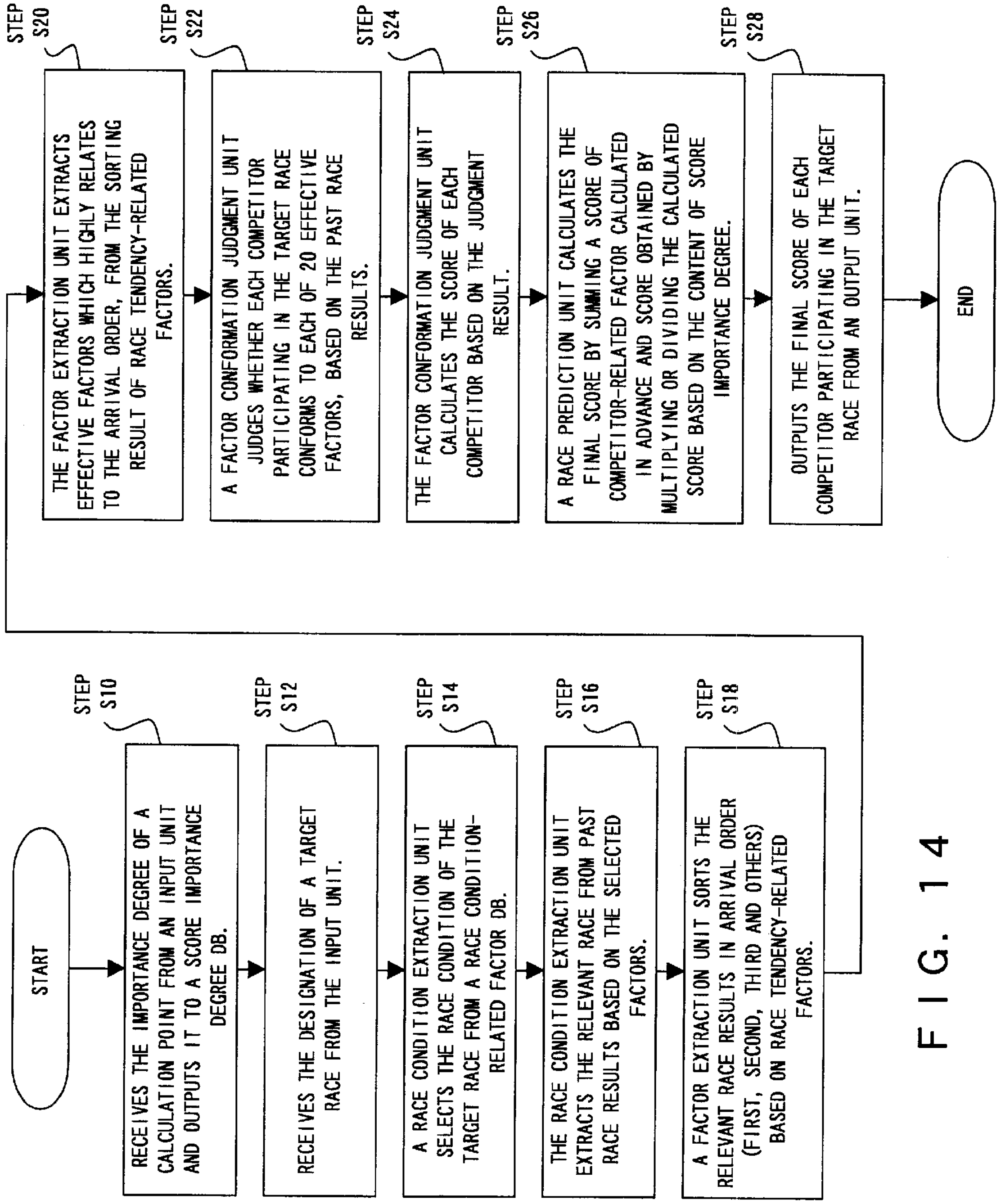
FIG. 14 is flowchart showing the process of the prediction device.
Figure 15:
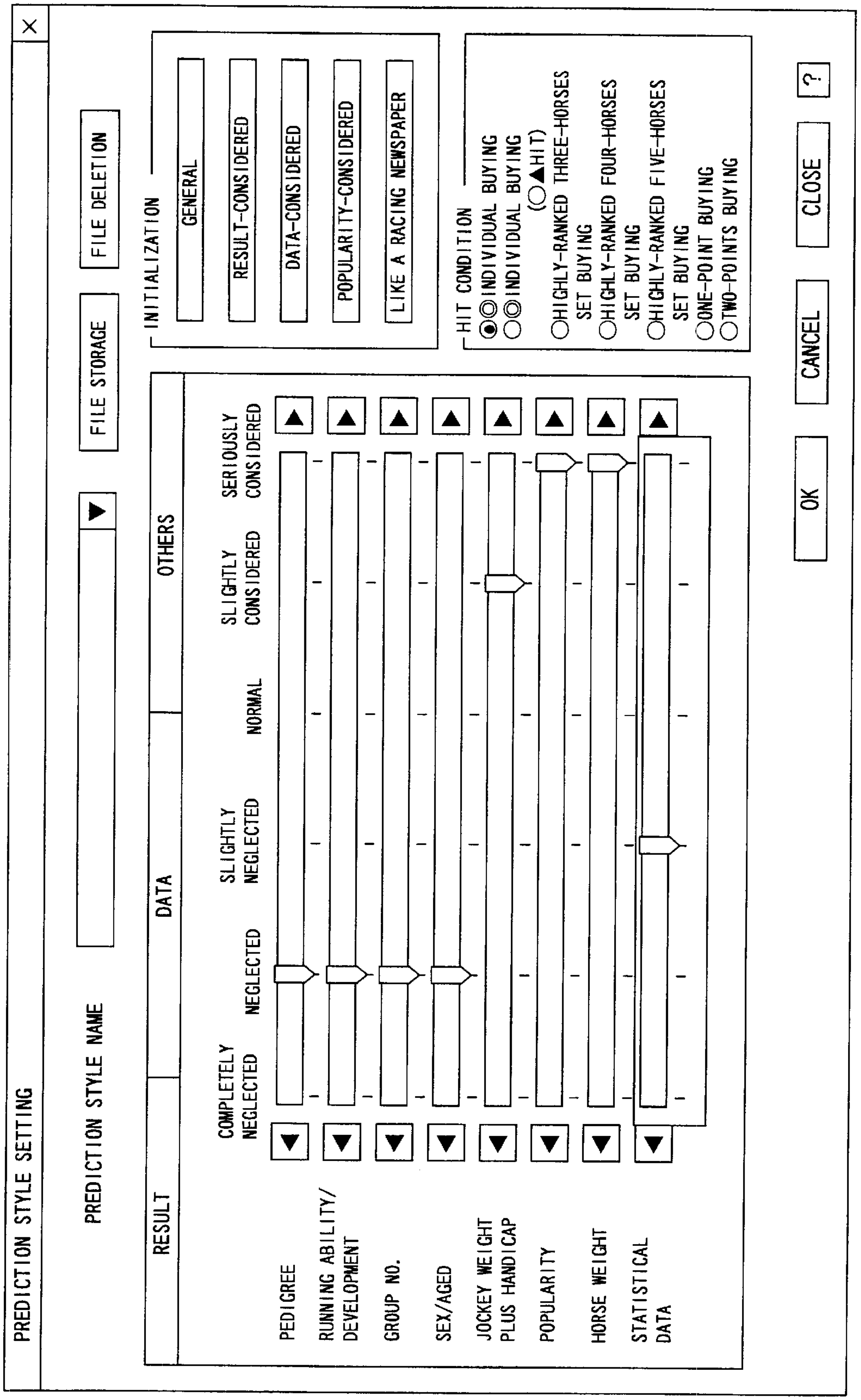
FIG. 15 shows an example of the screen for inputting score importance degree.

FIG. 14 is a flowchart showing the process of the prediction device. First, the prediction device 10 receives the importance degree of a calculated score via the input unit 11, and stores the received score importance degree in the score importance degree DB 21 (step S10). FIG. 15 shows an example of the input screen used when score importance degree is inputted. As shown in FIG. 15, a user can set the importance degree of each item of pedigree, running ability/development, group number, sex, age, Jockey weight plus handicap, popularity, horse weight and each piece of statistical data in each steps of "completely neglected, neglected, slightly neglected, normal, slightly considered, seriously considered". To reduce the burden of a user, options to automatically set the importance degree of each item, such as "general, result-considered, data-considered, popularity-considered, like a racing newspaper", etc., are also prepared. If a user inputs and stores a file name after setting the importance degree of each item, the setting result is stored in the score importance degree DB 21 as a numeric value.

Then, the prediction device 10 receives the designation of a target race via the input unit 11 (step S12). The process order of steps S10 and S12 can be reversed. The flowchart is described assuming that "Nakayama Gold Cup" is designated as a race.

The race condition extraction unit 13 selects the race condition-related factors of the received target race from the race condition-related factor DB 18 (step S14). For example, it is assumed that the race condition extraction unit 13 selects "Nakayama (winter)", "old horse open (handicapped)", "middle distance (lawn)", "except designated mare" from the race condition-related factor DB 18 as the race condition-related factors of "Nakayama Gold Cup".

The race condition extraction unit 13 extracts a past race result to be taken statistics of from the past race result DB 20 based on the selected race condition-related factors (step S16). For example, the race condition extraction unit 13 refers to the past race result DB 20, and extracts a past race result with the same race condition-related factors as that of the designated race "Nakayama Gold Cup". In the case of G1 (Grade 1) and JG1 (Jump Grade 1), it can also be configured to designate the same race as a statistical target and to omit steps S14 and S16. The number of past race results to be extracted can be limited to the latest 1,000 participating horses. In this way, time required to take statistics, etc., can be reduced.

Then, the factor extraction unit 14 sorts the past race results extracted in step S16 in arrival order (the first, second, third and others than first, second, third, fourth and fifth) (step S18) More specifically, the factor extraction unit 14 judges whether each competitor participating in all the past races, the results of which are extracted, conforms to each race tendency-related factor stored in the race tendency-related factor DB 19, and sorts the judgment results in arrival order. Then, the factor extraction unit 14 calculates the first/first or first or second victory ratio of each competitor conforming each race tendency-related factor based on the sorting result.

For example, a case where items No.138 "jockey changed" of race tendency-related factors stored in the race tendency-related factor DB 19 of the past race results extracted in step S16 are sorted in arrival order, is described. First, it is judged whether a jockey is changed for all the competitors participating in the extracted past races. Then, the judgment results are sorted in arrival order and the number of conforming competitors is counted.

Figure 16:
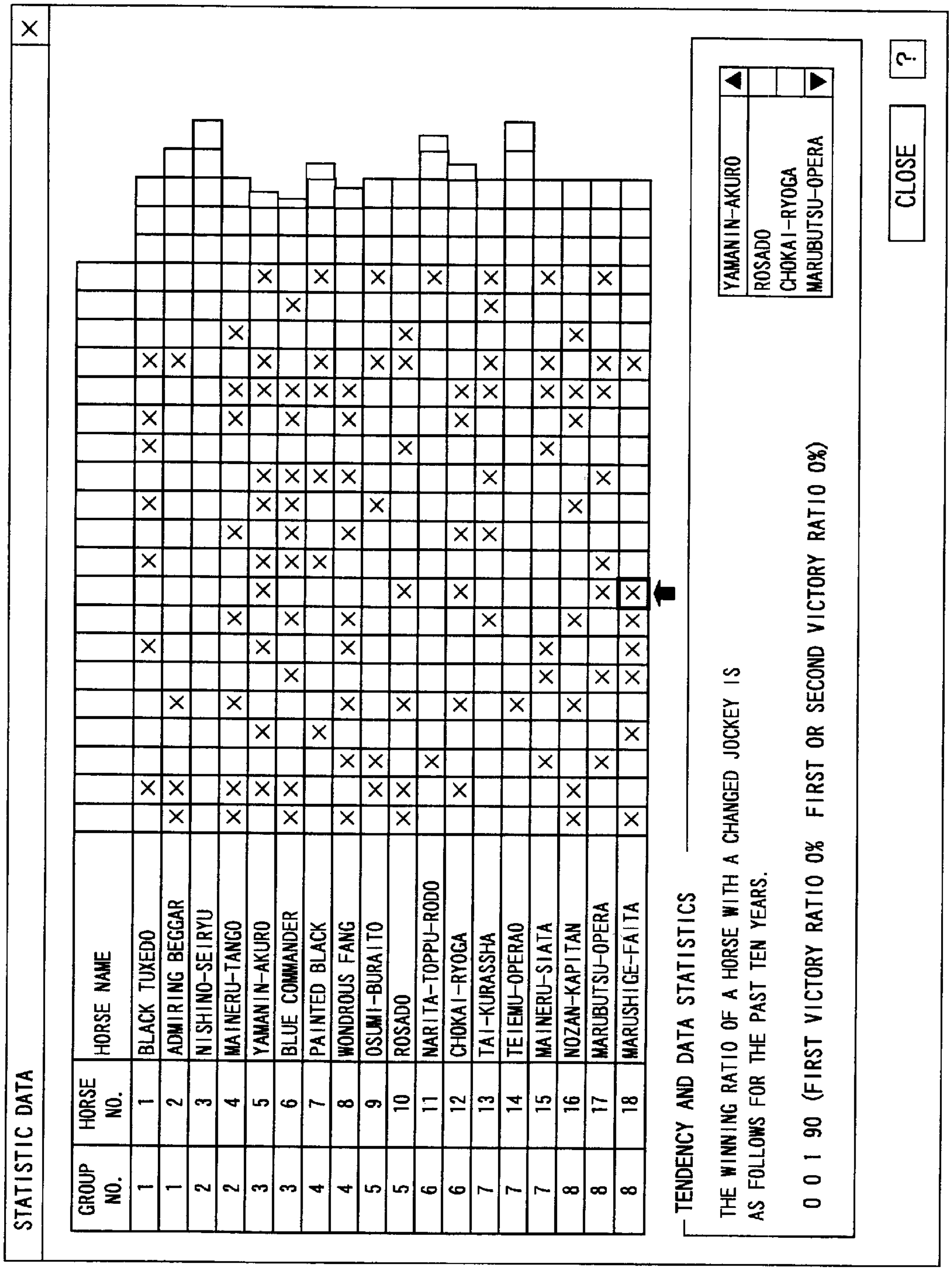
FIG. 16 shows an example of the screen for taking statistics of past race results and outputting the calculation result of a score for each competitor.

FIG. 16 shows an example of the screen for indicating a result obtained by taking statistics of past race results. "0 0 1 90 (first victory ratio 0%, first or first or second victory ratio 0%) is described in the column of "Tendency and data statistics" on the last line in FIG. 16. This statistical result indicates that in step S16 the past race results of 91 races are extracted, and as a result of sorting the race tendency-related factor of "jockey changed" of 91 races in arrival order, the number of a race where "a horse, the jockey of which is changed" finishes first or second, a race where such a horse finishes third, a race where such a horse finishes other than first, second, third, fourth and fifth and a race, the jockey of which is not changed are 0 (zero), 0 (zero), 1 (zero) and 90, respectively. Therefore, in this case, the first victory ratio and first or first or second victory ratio of a race tendency-related factor of "a horse, the jockey of which is changed" in the extracted past race results, both are 0%.

The factor extraction unit 14 extracts, for example, 20 race tendency-related factors closely related to arrival order as effective factors, based on the sorting result in step S18 (step S20). More specifically, the factor extraction unit 14 extracts race tendency-related factors, the first/first or first or second victory ratio is close to 100% or 0%, as effective factor in such closeness order. A race tendency-related factor, the first/first or second victory ratio of which is close to 100%, is often seen in a competitor which is higher in rank in the extracted past races. A race tendency-related factor, the first/first or second victory ratio of which is close to 0%, is often seen in a competitor which is lower in rank in the extracted past races. Therefore, such an effective factor can be considered to be useful for arrival order prediction.

The factor conformation judgment factor 15 refers to both result data stored in the past race result SB 20 and current data, which are not shown in FIG. 16, of each competitor participating in a target race and judges whether each competitor of the target race conforms to each extracted effective factor (step S22). More specifically, for example, in the case of a horse race, if a race tendency-related factor of "a horse that was most popular in a previous race" is extracted as one of effective factors, the first/first or second victory ratio of which is close to 100%, the factor conformation judgment unit 15 refers to the current data of each competitor participating in the target race and judges whether each competitor is "most popular". For example, if a race tendency-related factor of "the first, second or third order in a previous race" is extracted as one effective factor, the first/first or second victory ratio of which is close to 100%, the factor conformation judgment unit 15 refers to the data about a previous race stored in the past race result DB 20 of each competitor horse participating in the target race and judges whether each competitor horse is "the first, second or third order in a previous race". The factor conformation judgment unit 15 generates the table shown in FIG. 16 based on the judgment result.

The factor conformation judgment unit 15 calculates a score attached to each competitor participating in the target race (step S24). The factor conformation judgment unit 15 calculates a score in such a way that if a competitor conforms to many effective factors, the first/first or second victory ratio of which is close to 100%, the score may increase, and if a competitor conforms to many effective factors, the first/first or second victory ratio of which is close to 0%, the score may decrease.

The table shown in FIG. 16 shows a result obtained by the factor extraction unit 14 extracting 20 items of effective factors, the first/first or second victory ratio each are close to 0% and by the factor conformation judgment unit 15 judging whether each competitor participating in the target race conforms to each effective factor. In the table, a group number, a horse number, a horse name and each judgment result of each effective factor are shown in that order from the left. If a competitor conforms to an effective factor extracted by the factor extraction unit 14, the first/first or second victory ratio of which is 50% or more, the factor conformation judgment unit 15 attaches ○ to the competitor in the table. Reversely, if a competitor conforms to an effective factor extracted by the factor extraction unit 14, the first/first or second victory ratio of which is less than 50%, the factor conformation judgment unit 15 attaches x to the competitor. In FIG. 16, since the effective factor indicated by an arrow is an item "jockey changed" and is marked with x, it is found that an effective factor, the first/first or second victory ratio is close to 0, is extracted.

In the left end of the table, horizontal bar graphs are shown. These horizontal bar graphs indicate a score attached to each competitor by the factor conformation judgment unit 15. In FIG. 16 it is judged whether each competitor conforms to an effective factor, the first/first or second victory ratio of which is close to 0%. Therefore, the smaller the number of conforming competitors is (the smaller the number of x is), the higher the score becomes. For example, the score of a horse "Nishino-seiryu" with no x is highest.

Then, the race result prediction unit 16 obtains an analysis result based on the competitor-related factor of the target race from the competitor-related factor DB 17 and predicts the result of the target race by weighting both the obtained analysis result and score (statistical data) attached to each competitor by the factor conformation judgment unit 15, based on score importance degree stored in the score importance degree DB 21 (step S26).

The output unit 17 outputs the result obtained in step S26 to a user as the final score for each competitor of the target race (step S28). FIG. 18 shows an example of the screen for outputting a prediction result.

The race result prediction reliability of the present invention is described with reference to FIGS. 17 and 18. FIG. 17 shows the result of the conventional race result prediction. FIG. 18 shows the result of race result prediction using the present invention. A race to be used for prediction is the sixth day race in Tokyo of the third Tokyo Excellent Horse held Jun. 6, 1999 shown in FIG. 12. According to the conventional race result prediction shown in FIG. 17, three of five horses predicted to finish in a higher rank actually finish first, second, third, fourth or fifth. However, according to the race result prediction of the present invention shown in FIG. 18, four of the five horses highly ranked in prediction actually finish first, second, third, fourth or fifth. Therefore, it is found that prediction reliability is improved by using the statistical result of past race results.

Figure 19:
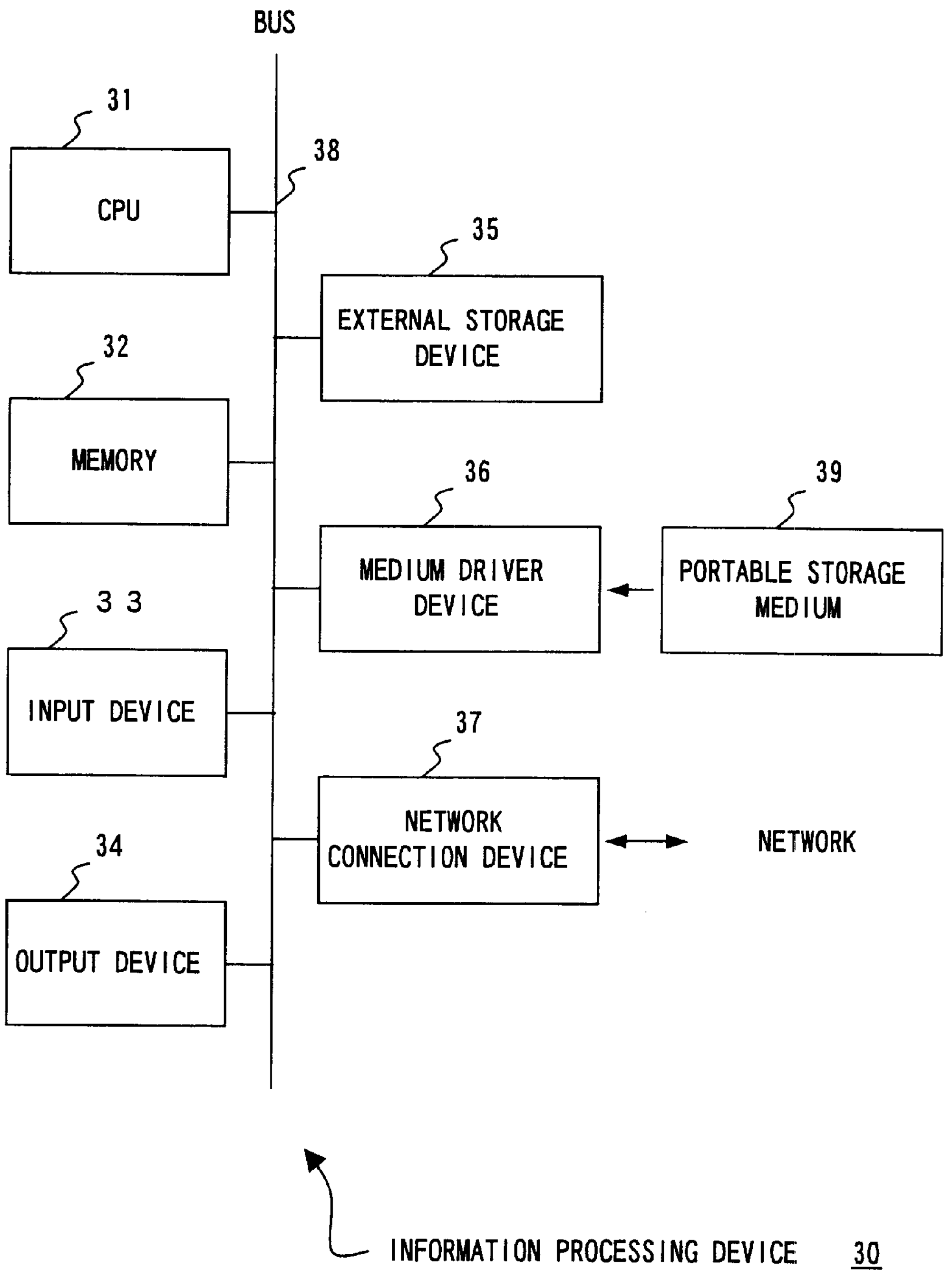
FIG. 19 shows the configuration of an information processing device.

The prediction device 10 described in the preferred embodiment can also be configured using an information processing device (computer) shown in FIG. 19. The information processing device 30 shown in FIG. 19 comprises a CPU 31, a memory 32, an input device 33, an output device 34, an external storage device 35, a medium driver device 36 and a network connection device 37, and they are connected to one another by a bus 38.

The memory 32 includes, for example, a ROM (read-only memory), a RAM (random-access memory), etc., and stores a program and data that are used for the process. The CPU 31 performs necessary processes by using the memory 32 and executing the program.

Each unit constituting the prediction device 10 in each preferred embodiment is stored in a specific program code segment of the memory 32 as a program. The input device 33 includes, for example, a keyboard, a pointing device, a touch panel, etc. The input device 33 is used for a user to input both instructions and information, and constitutes the input unit 11 shown in FIG. 5. The output device 34 includes, for example, a display, a printer, etc. The output unit 34 is used to output inquiries, process results, etc., to the user of the information processing device 30, and constitutes the output unit 12 shown in FIG. 5.

The external storage 35 includes, for example, a magnetic disk device, an optical disk device, a magneto-optical disk device, etc. The program and data can also be stored in this external storage device 35 and can also be used by loading them into the memory 32, as required. The memory 32 and/or external storage device 35 constitute each database of the prediction device 10.

The medium driver device 36 drives a portable storage medium 39 and accesses the recorded content. For the portable storage medium 39, an arbitrary computer-readable storage medium, such as a memory card, a memory stick, a floppy disk, a magneto-optical disk, a DVD (digital versatile disk), etc., are used. The program and data can also be stored in this portable storage medium 39 and can also be used by loading them into the memory 32, as required.

The network connection device 37 communicates with an outside device via an arbitrary network (line), such as a LAN, WAN, etc., and transmits/receives data accompanying communications. AS required, the program and data can also be received from an outside device and can also be used by loading them into the memory 32.

Figure 20:
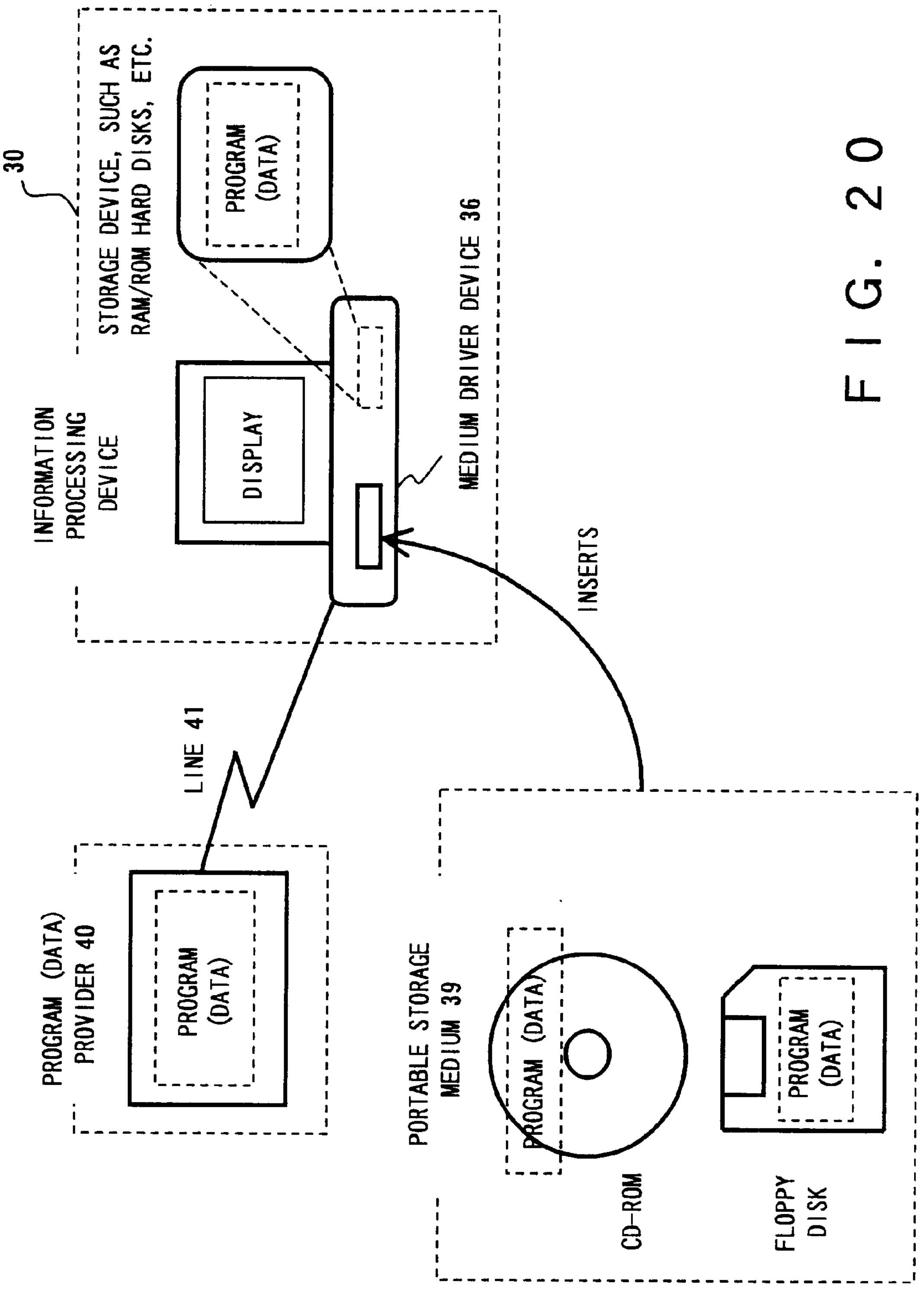
FIG. 20 shows a computer-readable storage medium, a transmission signal and transmission medium that can provide a computer with a program and data.

FIG. 20 shows the computer-readable storage medium, a transmission signal and an information storage medium for providing the program and data to the information processing device 30 shown in FIG. 19. The function equivalent to the prediction device 10 described in the preferred embodiment can also be performed by a general-purpose computer. To do so, a program for enabling a computer to execute the process to be performed by the prediction device 10 can be stored in advance in the computer-readable storage medium 39, can be read from the storage medium 39 in the way as shown in FIG. 20 by a computer 30, can be temporarily stored in the memory 32 or external storage device 35, can be read by the CPU 31 of the computer 30 and can be executed.

A transmission signal transmitted via a line 41 when the program is downloaded into the computer from a program (data) provider 40 can also enable a general-purpose computer to perform the function equivalent to the prediction device 10 described in the preferred embodiment.

Although so far the preferred embodiments of the present invention are described, the present invention is not limited to the preferred embodiments described above and a variety of the variations are also possible.

For example, it is described that the race condition extraction unit selects a race condition-related factor based on information stored in the race condition-related factor DB. However, a race condition-related factor can also be selected based on the input of a user.

For example, units and DBs constituting the prediction device 10 implement a series of business processes by operating in cooperation with one another. These units and DBs can be installed in the same server or can be operated in cooperation with one another via a network installed between different servers.

As described above in detail, according to the present invention, race result prediction hard to be influenced by subjectivity can be obtained by using a result obtained by statistically processing past race results with the same race conditions as those of a target race in addition to the analysis result of the race achievements, pedigree, etc., of each competitor participating in the target race.

While the invention has been described with reference to the preferred embodiments thereof, various modifications and changes may be made to those skilled in the art without departing from the true spirit and scope of the invention as defined by the claims thereof.

What is claimed is:

1. A computer-readable storage medium, on which is recorded a program for enabling a computer to exercise control over race result prediction, said program to make said computer perform the process comprising:

extracting past race results having a past race condition identical to a race condition of a target race, regardless of competitors participating in past races that produced the past race results;

performing statistical analysis of the past race results; and predicting a result of the target race based on both characteristics of each competitor participating in the target race and a result of the statistical analysis.

2. The storage medium according to claim 1, wherein the past race condition is at least one of a place where a past race occurred, a season when the past race occurred, a class of the past race, a distance of the past race, and a type of the past race.

3. The storage medium according to claim 1, the process further comprising:

extracting an effective factor, which is a factor related to arrival order, from the past race results in the statistical analysis, and judging whether each competitor participating in the target race conforms to the effective factor and associating information with each competitor based on a judgment result.

4. The storage medium according to claim 3, the process further comprising sorting the past race results based on predetermined items, and wherein said extracting extracts an item with a prescribed tendency seen in a competitor that has obtained a good result in the past races as the effective factor.

5. The storage medium according to claim 3, the process further comprising sorting the past race results based on predetermined items, and wherein said extracting extracts an item with a prescribed tendency seen in a competitor that has not obtained a good result in the past races as the effective factor.

6. The storage medium according to claim 5, wherein said extracting of the effective factor is based on at least one of a first victory ratio and a first or second victory ratio for the item.

7. The storage medium according to claim 5, wherein said predicting the result of the target race is further based on an importance degree indicating a degree of importance of both an analysis result that is based on a characteristic of each competitor participating in the target race and the result of the statistical analysis of the past race results.

8. A prediction method for predicting a result of a target race, comprising:

extracting past race results having a past race condition identical to a race condition of a target race, regardless of competitors participating in past races that produced the past race results;

performing statistical analysis of the past race results; and predicting a result of the target race based on both characteristics of each competitor participating in the target race and a result of the statistical analysis.

9. The prediction method according to claim 8, further comprising receiving the past race results via a network.

10. A prediction device for predicting a race result of a target race, comprising:

a race condition extraction unit to extract past race results having a past race condition identical to a race condition of a target race, regardless of competitors participating in past races that produced the past race results;

a statistical unit to perform statistical analysis of the past race results; and a prediction unit predicting a result of the target race based on both characteristics of each competitor participating in the target race and a result of the statistical analysis.

* * * * *